US010211457B2

(12) United States Patent
Weadock et al.

(10) Patent No.: US 10,211,457 B2
(45) Date of Patent: Feb. 19, 2019

(54) METAL HYDRIDE ALLOYS WITH IMPROVED RATE PERFORMANCE

(71) Applicant: CALIFORNIA INSTITUTE OF TECHNOLOGY, Pasadena, CA (US)

(72) Inventors: Nicholas J. Weadock, Pasadena, CA (US); Hongjin Tan, Pasadena, CA (US); Brent T. Fultz, Pasadena, CA (US); Heng Yang, Pasadena, CA (US)

(73) Assignee: California Institute of Technology, Pasadena, CA (US)

( * ) Notice: Subject to any disclaimer, the term of this patent is extended or adjusted under 35 U.S.C. 154(b) by 181 days.

(21) Appl. No.: 15/046,104

(22) Filed: Feb. 17, 2016

(65) Prior Publication Data
US 2016/0344022 A1 Nov. 24, 2016

Related U.S. Application Data

(60) Provisional application No. 62/117,327, filed on Feb. 17, 2015.

(51) Int. Cl.
C23C 8/08 (2006.01)
H01M 4/38 (2006.01)
(Continued)

(52) U.S. Cl.
CPC ............ H01M 4/383 (2013.01); B22D 11/06 (2013.01); B22D 18/06 (2013.01); C21D 1/58 (2013.01);
(Continued)

(58) Field of Classification Search
CPC .................................................. H01M 4/383
See application file for complete search history.

(56) References Cited

U.S. PATENT DOCUMENTS 4,551,400 A 11/1985 Sapru et al.
6,210,498 B1 4/2001 Ovshinsky et al.
(Continued)

FOREIGN PATENT DOCUMENTS

JP H09-049034 A 2/1997
JP 2004-192965 A 7/2004

OTHER PUBLICATIONS

Inoue et al. (Oct. 2011) "Charge-discharge performance of Cr-substituted V-based hydrogen storage alloy negative electrodes for use in nickel-metal hydride batteries," Electrochimica Acta. 59:23-31.
(Continued)

Primary Examiner — Scott R Kastler
(74) Attorney, Agent, or Firm — Leydig, Voit & Mayer, Ltd.

(57) ABSTRACT

Methods of preparing improved metal hydride alloy materials are provided. The alloys include a mixture of at least four of vanadium, titanium, nickel, chromium, and iron. The alloy is processed by at least one of thermal and physical treatment to generate a refined microstructure exhibiting improved kinetics when used as electrodes in MH batteries (e.g., higher discharge current). The thermal treatment includes rapid cooling of the alloy at greater than $10^4$ K/s. The physical treatment includes mechanical pulverization of the alloy after cooling. The microstructure is a single phase (body centered cubic) with a heterogeneous composition including a plurality of primary regions having a lattice parameter selected from the range of 3.02 Å to 3.22 Å and a plurality of secondary regions having a lattice parameter selected from the range of 3.00 Å to 3.22 Å and at least one physical dimension having a maximum average value less than 1 μm.

58 Claims, 19 Drawing Sheets

(51) Int. Cl.
| | |
|---|---|
| C22C 14/00 | (2006.01) |
| C22C 27/02 | (2006.01) |
| C22C 1/02 | (2006.01) |
| C22F 1/18 | (2006.01) |
| C21D 1/60 | (2006.01) |
| C21D 1/58 | (2006.01) |
| C21D 1/613 | (2006.01) |
| B22D 18/06 | (2006.01) |
| B22D 11/06 | (2006.01) |
| C23C 8/80 | (2006.01) |
| H01M 4/62 | (2006.01) |
| C22C 1/04 | (2006.01) |
| B22F 9/04 | (2006.01) |
| H01M 10/34 | (2006.01) |
| H01M 12/08 | (2006.01) |

(52) U.S. Cl.
CPC ............... *C21D 1/60* (2013.01); *C21D 1/613* (2013.01); *C22C 1/02* (2013.01); *C22C 1/045* (2013.01); *C22C 14/00* (2013.01); *C22C 27/025* (2013.01); *C22F 1/18* (2013.01); *C22F 1/183* (2013.01); *C23C 8/08* (2013.01); *C23C 8/80* (2013.01); *H01M 4/621* (2013.01); *B22F 2009/043* (2013.01); *B22F 2998/10* (2013.01); *H01M 10/345* (2013.01); *H01M 12/08* (2013.01); *Y02E 60/128* (2013.01)

(56) References Cited

U.S. PATENT DOCUMENTS

| | | | |
|---|---|---|---|
| 2001/0003997 A1* | 6/2001 | Fetcenko | C01B 3/0031 148/442 |
| 2006/0032561 A1 | 2/2006 | Young et al. | |
| 2014/0194282 A1* | 7/2014 | Young | H01M 4/383 502/337 |
| 2016/0344022 A1* | 11/2016 | Weadock | H01M 4/383 |

OTHER PUBLICATIONS

Inoue, et al. (Jan. 2015), "High Capacity Hydrogen Storage Alloy Negative Electrodes for Use in Nickel-Metal Hydride Batteries," J. Alloys Compd., 645, Supplement 1, 2015, S136-S139.

Iwakura, et al. (2000), "Electrochemical and Structural Characterization of To—V—Ni Hydrogen Storage Alloys With BCC Structure," J. Electrochem. Soc., 147, 2503-2506, 2000.

Krstajić et al. (1997) "The determination of kinetics parameters of the hydrogen evolution on Ti—Ni alloys by ac impedance," Electrochimica Acta. 42:323-330.

Massicot et al. (Sep. 2010), "Hydrogenation properties of Fe—Ti—V bcc alloys," J. Alloys Compd. 2011, 509, No. 2, 372-379.

Pan et al. (2004) "A study on the cycling stability of the Ti—V-based hydrogen storage electrode alloys," J. Alloys Comp. 364:271-279.

Pei et al. (Aug. 2009) "The effect of rapid solidification on the microstructure and hydrogen storage properties of $V_{35}Ti_{25}Cr_{40}$ hydrogen storage alloy," Int. J. Hydrogen Energy. 34:8094-8100.

Tsukahara et al. (1995), "Phase Structure of V-Based Solid Solutions Containing Ti and Ni and Their Hydrogen Absorption-Desorption Properties," J. Alloys Compd., 224, 162-167, 1995.

Tsukahara et al. (1997) "Vanadium-based solid solution alloys with three-dimensional network structure for high capacity metal hydride electrodes," J. Alloys Comp. 253-254:583-586.

Wu et al. (Dec. 2007) "Microstructure and hydrogenation behavior of ball-milled and melt-spun Mg—10Ni—2Mm alloys," J. Alloys Comp. 466:176-181.

Young et al. (Oct. 17, 2013) "The Current Status of Hydrogen Storage Alloy Development for Electrochemical Applications," Materials. 6:4574-4608.

Zhang et al. (2004) "Effects of rapid solidification on the phase structures and electrochemical properties of a $V_3TiNi_{0.56}Co_{0.14}Nb_{0.047}Ta_{0.047}$," J. Alloys Comp. 370:321-325.

Zhu et al. (Sep. 2007) "Effect of rapid solidification on the structural and electrochemical properties of the Ti—V-based hydrogen storage electrode alloy," J. Alloys Comp. 463:528-532.

* cited by examiner

CONVENTIONALLY COOLED $Ti_{29}V_{56}Cr_6Ni_9$
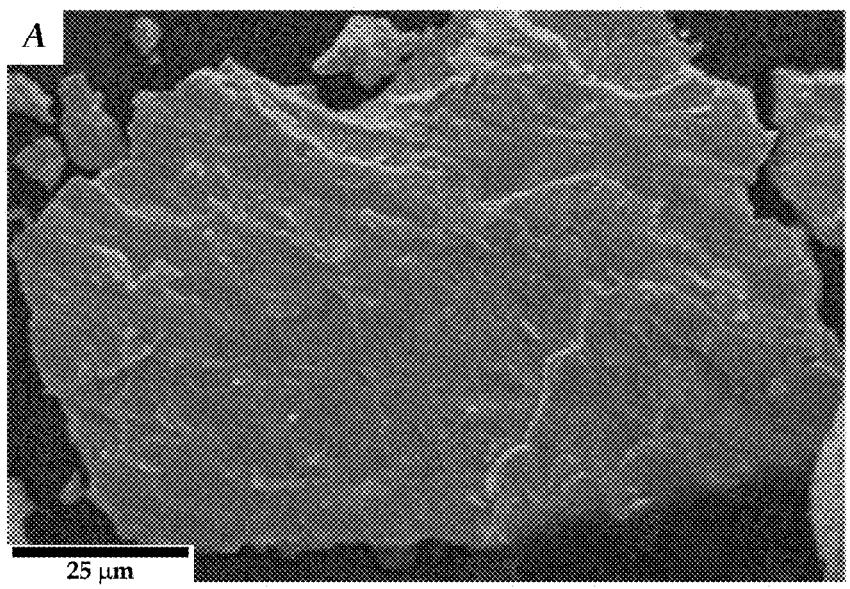
RAPIDLY COOLED $Ti_{29}V_{56}Cr_6Ni_9$
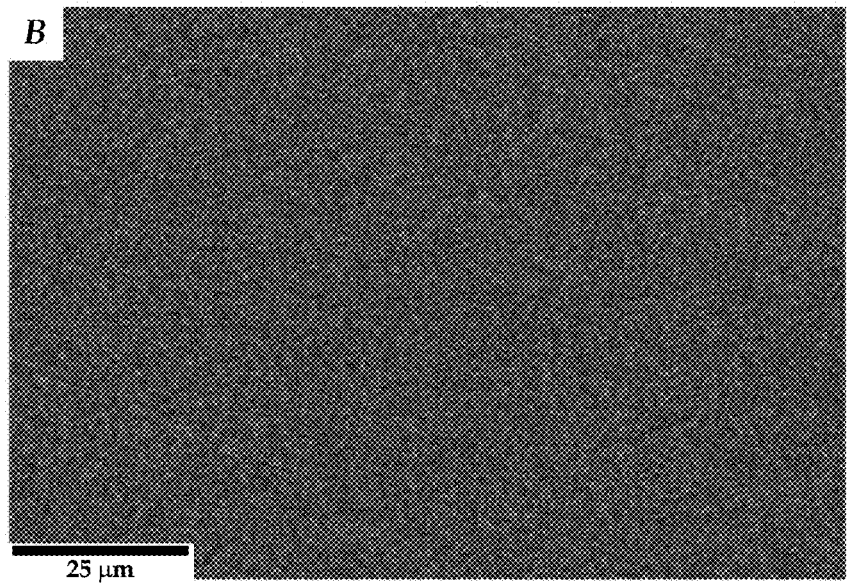
*FIG. 3*

CONVENTIONALLY COOLED $Ti_{29}V_{53}Cr_9Ni_9$
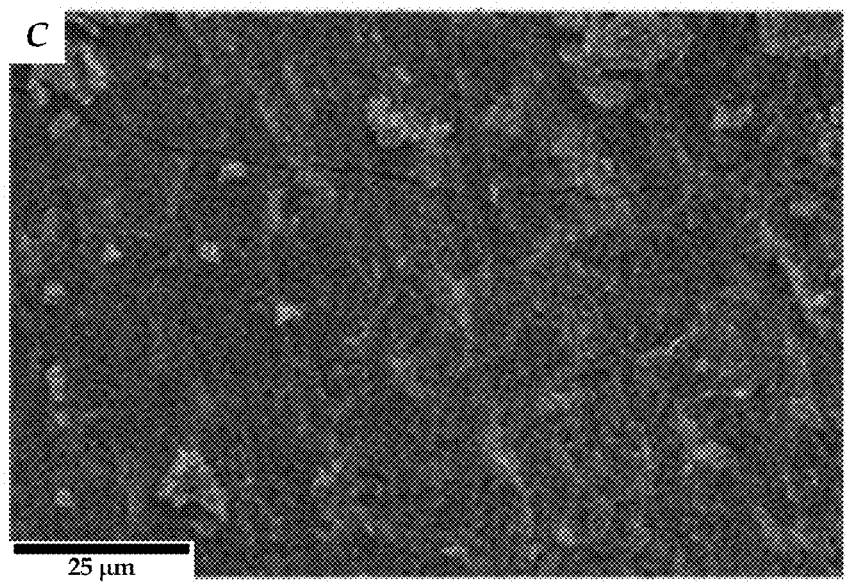
RAPIDLY COOLED $Ti_{29}V_{53}Cr_9Ni_9$
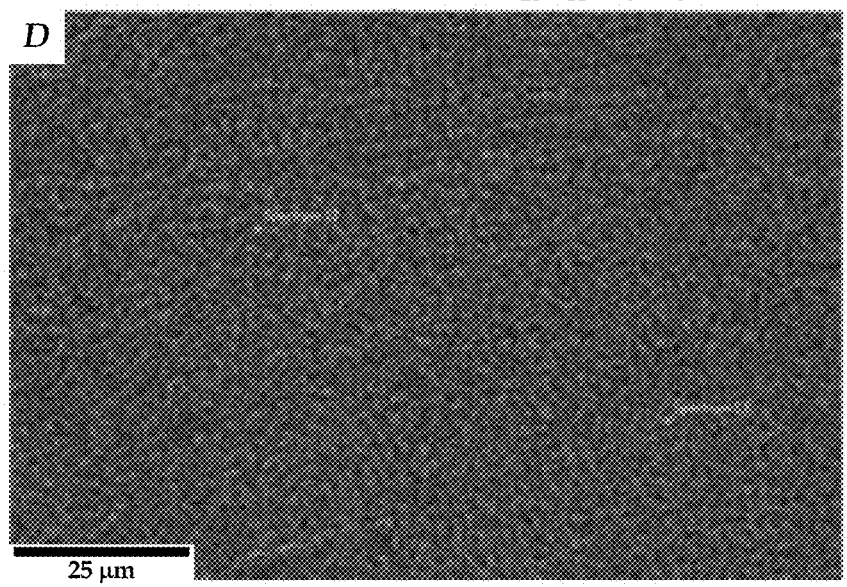
*FIG. 3 (CON'T)*
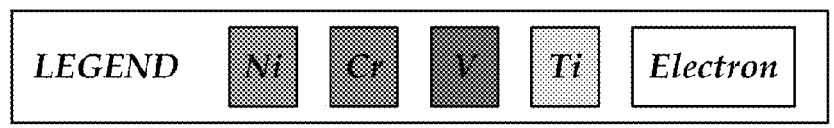

CONVENTIONALLY COOLED $TiV_{1.7}Ni_{0.3}Fe_{0.4}$

CONVENTIONALLY COOLED $TiV_{1.7}Ni_{0.3}Cr_{0.4}$

RAPIDLY COOLED $TiV_{1.7}Ni_{0.3}Cr_{0.4}$

RAPIDLY COOLED $TiV_{1.9}Ni_{0.3}Cr_{0.2}$

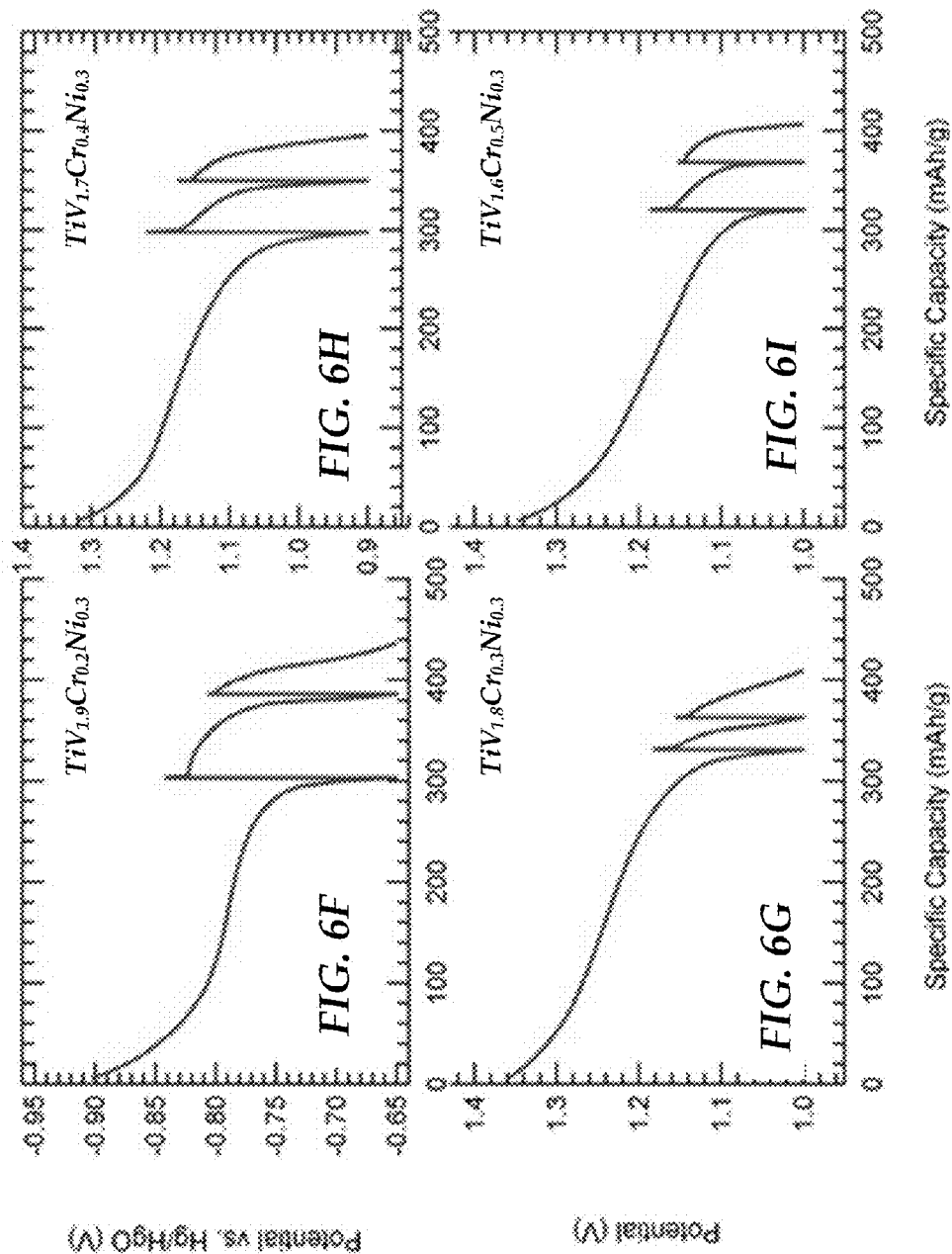

$TiV_{1.7}Ni_{0.3}Cr_{0.4}$ PRE-CYCLED MATERIAL $TiV_{1.7}Ni_{0.3}Cr_{0.4}$ POST-CYCLED MATERIAL

METAL HYDRIDE ALLOYS WITH IMPROVED RATE PERFORMANCE

CROSS-REFERENCE TO RELATED APPLICATION(S)

This application claims the benefit of U.S. Provisional Application No. 62/117,327, filed on Feb. 17, 2015 and entitled, "Metal Hydride Alloys With Improved Rate Performance." The entirety of the above application including its teachings is incorporated herein by reference.

GOVERNMENT SUPPORT

This invention was made with government support under Grant No. ARPA-E awarded by DARPA. The government has certain rights in the invention.

The invention described herein was made in the performance of work under a NASA contract NNN12AA01C, and is subject to the provisions of Public Law 96-517 (35 USC 102) in which the Contractor has elected to retain title.

This invention was made with government support under Award Number DE-SC0001057 as a part of EFree (Energy Frontier Research in Extreme Environments), an Energy Frontier Research Center funded by the US Department of Energy, Office of Science, Basic Energy Sciences. The government has certain rights in the invention.

BACKGROUND

Conventional hydride-based batteries provide a low-cost energy storage system. For example, conventional nickel-metal hydride (MH) batteries include a positive electrode containing nickel hydroxide, a negative electrode containing metal hydride, a separator between the positive and negative electrodes and an alkaline electrolyte. The electrolyte commonly includes an aqueous solution of potassium hydroxide. Charge and discharge reactions for nickel metal hydride batteries may be written as:

Positive electrode:

$$Ni(OH)_2 + OH^- \rightarrow NiOOH + H_2O + e^- \text{ (charge)} \quad (1)$$

$$NiOOH + H_2O + e^- \rightarrow Ni(OH)_2 + OH^- \text{ (discharge)} \quad (2)$$

Negative electrode:

$$M + H_2O + e^- \rightarrow MH_{ab} + OH^- \text{ (charge)} \quad (3)$$

$$MH_{ab} + OH^- \rightarrow M + H_2O + e^- \text{ (discharge)} \quad (4)$$

where M is a hydrogen storage alloy and $H_{ab}$ is absorbed hydrogen.

However, the energy density of these batteries can be relatively low. For example, state-of-the-art metal hydride batteries can provide an energy density of approximately of 60~100 Whr/kg.

Accordingly, there exists a continued need for higher capacity hydrogen storage alloys, which can lead to improved energy density of metal hydride/nickel batteries, and even more significantly, metal hydride-air batteries.

SUMMARY

In an embodiment, a method of fabricating a metal alloy is provided. The method includes the steps of, providing an alloy precursor including at least four of titanium (Ti), chromium (Cr), vanadium (V), iron (Fe), and nickel (Ni), and processing the alloy precursor using at least one of a thermal or physical treatment to generate a heterogeneous microstructure having a body centered cubic (BCC) crystal structure. The heterogeneous microstructure includes a plurality of primary regions characterized by a lattice parameter selected from the range of 3.02 Å to 3.22 Å and a plurality of secondary regions characterized by a lattice parameter selected from the range of 3.00 Å to 3.22 Å and having at least one physical dimension with a maximum average value less than 1 μm.

Embodiments of the method may include one or more of the following, in any combination.

In an embodiment of the method, the alloy is capable of sorbing at least 1.3 wt. % hydrogen at a pressure less than 2 atm.

In an embodiment of the method, the maximum average value of the at least one physical dimension is less than 0.50 μm.

In an embodiment of the method, a maximum average distance from a center of a primary region to a nearest secondary region is less than 1.5 μm.

In an embodiment of the method, the secondary region is mixed within a matrix of the primary region.

In an embodiment of the method, the plurality of primary regions are further characterized by vanadium greater than 54 at. % and an amount of nickel less than 9 at. % and the plurality of secondary regions are further characterized by an amount of vanadium less than 40 at. % and an amount of nickel greater than 15 at. %.

In an embodiment of the method, the plurality of primary regions are further characterized by an amount of titanium less than 31 at. % and the plurality of secondary regions are further characterized by an amount of titanium greater than 30 at. %.

In an embodiment of the method, the heterogeneous microstructure further includes a plurality of boundary regions extending between the plurality of primary regions and the plurality of secondary regions. The plurality of boundary regions are characterized by a lattice parameter selected from the range of 3.00 Å to 3.22 Å.

In an embodiment of the method, the composition of the primary region includes at least four of: 18 at. % to 31 at. % Ti, 54 at. % to 72 at. % V, 6 at. % to 13 at. % Cr, 2 at. % to 12 at. % Fe, and 3 at. % to 9 at. % Ni.

In an embodiment of the method, the composition of the secondary region includes at least four of: 30 at. % to 50 at. % Ti, 8 at. % to 40 at. % V, 2 at. % to 5 at. % Cr, 5 at. % to 18 at. % Fe, and 15 at. % to 42 at. % Ni.

In an embodiment of the method, the providing step includes mixing at least four of titanium (Ti), chromium (Cr), vanadium (V), iron (Fe), and nickel (Ni), melting the mixture to generate a first melt, and cooling the first melt to generate an ingot of the alloy precursor including a mixture of the at least four of titanium (Ti), chromium (Cr), vanadium (V), iron (Fe), and nickel (Ni).

In an embodiment, the method further includes processing the alloy precursor using a thermal treatment. The thermal treatment includes melting the alloy precursor to generate a second melt and cooling the second melt at a rate selected from the range of greater than $10^4$ K/s to less than $10^8$ K/s to generate the heterogeneous microstructure.

In an embodiment of the method, cooling is performed by at least one of suction casting, liquid quenching, air quenching, gas atomization, and melt spinning.

In an embodiment, the method further includes processing the alloy precursor using a physical treatment, the physical treatment including pulverizing the alloy precursor to a powder having a particle size selected from the range of 0.1 μm to 75 μm.

In an embodiment of the method, the pulverizing includes at least one of mechanical crushing, grinding, and ball milling.

In an embodiment of the method, the metal alloy is $Ti_aV_bNi_cCr_dFe_e$, where a is selected from the range of 0 at. % to 97 at. %, b is selected from the range of 0 at. % to 100 at. %, c is selected from the range of 3 at. % to 20 at. %, d is selected from the range of 0 at. % to 20 at. %, and e is selected from the range of 0 at. % to 20 at. %.

In an embodiment, a method of forming a metal hydride electrode is provided. The method includes providing an active material including the alloy, mixing a powder of the active material with a binder, and compressing the mixture of powdered active material and the binder into a desired electrode shape.

In an embodiment of the method, the active material is treated by a hydriding/dehydriding operation for 5 cycles under a pressure from the range between 8 bar to 50 bar prior to mixing with the binder.

In an embodiment of the method, the binder is a conductive binder selected from powders of at least one of nickel, copper, or carbon powder. In another embodiment, a polymer binder such as polyvinyl alcohol (PVA) and/or polytetrafluoroethylene (PTFE) are used together with the conductive binder.

In an embodiment of the method, the powdered active material and the conductive binder are mixed in a ratio selected from the range of 95:5 and 25:75. In another embodiment, the powdered active material, conductive binder and polymer binder are mixed in a ratio selected from the range of 90:5:5, to 20:60:20.

In an embodiment of the method, the metal hydride electrode is capable of electrochemical discharge capacity of at least 350 mAh/g at currents of at least 10 mA/g.

In an embodiment of the method, the metal hydride electrode is capable of discharging at least 65% of a total capacity of the electrode at 167 mA/g for at least 100 cycles.

In an embodiment of the method, an exchange current density of the metal hydride electrode exhibits an improvement of at least 10% with respect to an electrode of the same composition in which the alloy precursor is not processed using the at least one thermal or physical treatment.

In an embodiment of the method, a limiting current density of the metal hydride electrode exhibits an improvement of at least 10% with respect to an electrode of the same composition in which the alloy precursor is not processed using the at least one thermal or physical treatment.

In an embodiment, a metal alloy is provided. The metal alloy includes a composition including at least four of titanium (Ti), chromium (Cr), vanadium (V), iron (Fe), and nickel (Ni). The alloy is further characterized by a heterogeneous, single phase microstructure having a body centered cubic (BCC) crystal structure. The heterogeneous microstructure includes a plurality of primary regions characterized by a lattice parameter selected from the range of 3.02 Å to 3.22 Å and a plurality of secondary regions characterized by a lattice parameter selected from the range of 3.00 Å to 3.22 Å and having at least one physical dimension with a maximum average value less than 1 μm.

Embodiments of the metal alloy may include one or more of the following, in any combination.

In an embodiment, the metal alloy is capable of sorbing at least 1.3 wt. % hydrogen at a pressure less than 2 atm.

In an embodiment of the metal alloy, the maximum average value of the at least one physical dimension is less than 0.5 μm.

In an embodiment of the metal alloy, a maximum average distance from a center of a primary region to a nearest secondary region is less than 1.5 μm.

In an embodiment of the metal alloy, the secondary region is mixed within a matrix of the primary region.

In an embodiment of the metal alloy, the plurality of primary regions are further characterized by an amount of vanadium greater than 54 at. % and an amount of nickel less than 9 at. % and the plurality of secondary regions are further characterized by an amount of vanadium less than 40 at. % and an amount of nickel greater than 15 at. %.

In an embodiment of the metal alloy, the plurality of primary regions are further characterized by an amount of titanium less than 31 at. % and the plurality of secondary regions are further characterized by an amount of titanium greater than 30 at. %.

In an embodiment of the metal alloy, the heterogeneous microstructure further includes a plurality of boundary regions extending between the plurality of primary regions and the plurality of secondary regions. The plurality of boundary regions are characterized by a lattice parameter selected from the range of 3.00 Å to 3.22 Å.

In an embodiment of the metal alloy, the composition of the primary region includes at least four of 18 at. % to 31 at. % Ti, 54 at. % to 72 at. % V, 6 at. % to 13 at. % Cr, 2 at. % to 12 at. % Fe and 3 at. % to 9 at. % Ni.

In an embodiment of the metal alloy, the composition of the secondary region includes at least four of 30 at. % to 50 at. % Ti, 8 at. % to 40 at. % V, 2 at. % to 5 at. % Cr; 5 at. % to 18 at. % Fe, and 15 at. % to 42 at. % Ni.

In an embodiment of the metal alloy, the metal alloy composition is $Ti_aV_bNi_cCr_dFe_e$, where a is selected from the range of 0 at. % to 97 at. %, b is selected from the range of 0 at. % to 100 at. %, c is selected from the range of 3 at. % to 20 at. %, d is selected from the range of 0 at. % to 20 at. %, and e is selected from the range of 0 at. % to 20 at. %.

In an embodiment the metal alloy is $Ti_{29}V_{56}Cr_6Ni_9$, $Ti_{29}V_{53}Cr_9Ni_9$, or $Ti_{29}V_{50}Cr_{12}Ni_9$.

In an embodiment of the metal alloy, the composition is $Ti_aV_{2.1-b}Ni_cFe_d$ and the ratio of Fe/(V+Fe) is selected from the range of 0 to 0.4. This composition range encompasses two common ferrovanadium master alloys, $Fe_{20}V_{80}$ and $Fe_{40}V_{60}$.

In an embodiment, a metal hydride electrode is provided. The metal hydride electrode includes an active material including the metal alloy and a binder.

In an embodiment of the metal hydride electrode, the binder is selected from at least one of nickel, copper, and carbon.

In an embodiment of the metal hydride electrode, the active material and the binder are mixed in a ratio selected from the range between 95:5 and 25:75.

In an embodiment of the metal hydride electrode, the metal hydride electrode is capable of electrochemical discharge capacity of at least 350 mAh/g at currents of at least 10 mA/g.

In an embodiment of the metal hydride electrode, the metal hydride electrode is capable of discharging at least about 65% of a total capacity of the electrode at 167 mA/g for at least 100 cycles.

In an embodiment of the metal hydride electrode, an exchange current density of the metal hydride electrode exhibits an improvement of at least 10% with respect to an electrode of the same composition in which the alloy precursor is not processed using the at least one thermal or physical treatment.

In an embodiment of the metal hydride electrode, a limiting current density of the metal hydride electrode exhibits an improvement of at least 10% with respect to an electrode of the same composition in which the alloy precursor is not processed using the at least one thermal or physical treatment.

In an embodiment, a metal alloy is provided. The metal alloy includes a composition formed from an alloy precursor including at least four of titanium (Ti), chromium (Cr), vanadium (V), iron (Fe), and nickel (Ni). The alloy precursor is processed using at least one of a thermal or physical treatment to generate an alloy possessing a heterogeneous, single phase microstructure having a body centered cubic (BCC) crystal structure. The heterogeneous microstructure includes a mixture of a plurality of secondary regions in a matrix of a plurality of primary regions. The plurality of primary regions are characterized by a lattice parameter selected from the range of 3.02 Å to 3.22 Å and the plurality of secondary regions are characterized by a lattice parameter selected from the range of 3.00 Å to 3.22 Å and having at least one physical dimension with a maximum average value less than 1 μm.

Embodiments of the metal alloy may include one or more of the following, in any combination.

In an embodiment of the metal alloy, the alloy is capable of sorbing at least 1.3 wt. % hydrogen at a pressure less than 2 atm.

In an embodiment of the metal alloy, the maximum average value of the at least one physical dimension is less than 0.50 μm In an embodiment of the metal alloy, a maximum average distance from a center of a primary region to a nearest secondary region is less than 1.5 μm.

In an embodiment of the metal alloy, the plurality of primary regions are further characterized by an amount of vanadium greater than 54 at. % and an amount of nickel less than 9 at. % and the plurality of secondary regions are further characterized by an amount of vanadium less than 40 at. % and an amount of nickel greater than 15 at %.

In an embodiment of the metal alloy, the plurality of primary regions are further characterized by an amount of titanium less than 31 at. % and the plurality of secondary regions are further characterized by an amount of titanium greater than 30 at. %.

In an embodiment of the metal alloy, the heterogeneous microstructure further includes a plurality of boundary regions extending between the plurality of primary regions and the plurality of secondary regions. The plurality of boundary regions are characterized by a lattice parameter selected from the range of 3.00 Å to 3.22 Å.

In an embodiment of the metal alloy, the composition of the primary region includes at least four of 18 at. % to 31 at. % Ti, 54 at. % to 72 at. % V, 6 at. % to 13 at. % Cr, 2 at. % to 12 at. % Fe, and 3 at. % to 9 at. % Ni.

In an embodiment of the metal alloy, the composition of the secondary region includes at least four of 30 at. % to 50 at. % Ti, 8 at. % to 40 at. % V, 2 at. % to 5 at. % Cr, 5 at. % to 18 at. % Fe, and 15 at. % to 42 at. % Ni.

In an embodiment of the metal alloy, the alloy precursor includes a homogenous mixture of the at least four of titanium (Ti), chromium (Cr), vanadium (V), iron (Fe), and nickel (Ni).

In an embodiment of the metal alloy, the processing includes melting the alloy precursor and cooling the melt at a rate selected from the range of greater than $10^4$ K/s to less than $10^8$ K/s.

In an embodiment of the metal alloy, the cooling includes at least one of suction casting, liquid quenching, air quenching, gas atomization, and melt spinning.

In an embodiment of the metal alloy, the processing including a physical treatment including pulverizing the alloy precursor to a powder having a particle size less selected in the range of 0.1 μm to 75 μm.

In an embodiment of the metal alloy, the pulverization includes at least one of mechanical crushing, grinding, and ball milling.

In an embodiment of the metal alloy, the metal alloy composition is $Ti_aV_bNi_cCr_dFe_e$, where a is selected from the range of 0 at. % to 97 at. %, b is selected from the range of 0 at. % to 100 at. %, c is selected from the range of 3 at. % to 20 at. %, d is selected from the range of 0 at. % to 20 at. %, and e is selected from the range of 0 at. % to 20 at. %.

In an embodiment, the metal alloy is $Ti_{29}V_{56}Cr_6Ni_9$, $Ti_{29}V_{53}Cr_9Ni_9$, or $Ti_{29}V_{50}Cr_{12}Ni_9$.

In an embodiment of the metal alloy, the composition is $Ti_aV_{2.1-b}Ni_cFe_d$ and the ratio of Fe/(V+Fe) is selected from the range of 0 to 0.4.

In an embodiment a metal hydride electrode is provided. The metal hydride electrode includes an active material including the metal alloy and a binder.

In an embodiment of the metal hydride electrode, the active material is treated by a hydriding/dehydriding operation for 5 cycles under a pressure from the range between 8 bar to 50 bar prior to mixing with the binder.

In an embodiment of the metal hydride electrode, the binder is selected from at least one of nickel, copper, and carbon.

In an embodiment of the metal hydride electrode, the active material and the binder in a ratio selected from the range between 95:5 and 25:75.

In an embodiment, the metal hydride electrode is capable of electrochemical discharge capacity of at least 350 mAh/g at currents of at least 10 mA/g.

In an embodiment, the metal hydride electrode is capable of discharging at least 65% of a total capacity of the electrode at 167 mA/g for at least 100 cycles.

In an embodiment, an exchange current density of the metal hydride electrode exhibits an improvement of at least 10% with respect to an electrode of the same composition in which the alloy precursor is not processed using the at least one thermal or physical treatment.

In an embodiment, a limiting current density of the metal hydride electrode exhibits an improvement of at least 10% with respect to an electrode of the same composition in which the alloy precursor is not processed using the at least one thermal or physical treatment.

BRIEF DESCRIPTION OF THE DRAWINGS

The foregoing and other objects, features and advantages will be apparent from the following more particular description of the embodiments, as illustrated in the accompanying drawings in which like reference characters refer to the same parts throughout the different views. The drawings are not necessarily to scale, emphasis instead being placed upon illustrating the principles of the embodiments.

FIG. 3: A-D are scanning electron micrographs of Ti—V—Cr—Ni alloys processed by conventional cooling (A, C) and embodiments of the disclosed rapid cooling (B, D);

FIGS. 6F-6I are data plots of potential as a function of specific discharge capacity during a three step discharge for embodiments of Ti—V—Cr—Ni alloys processed by rapid cooling and having different compositions;

(FIG. 7A) as a function of discharge current density; (FIG. 7B) as a function of cycle number;

DETAILED DESCRIPTION

Figure 1:
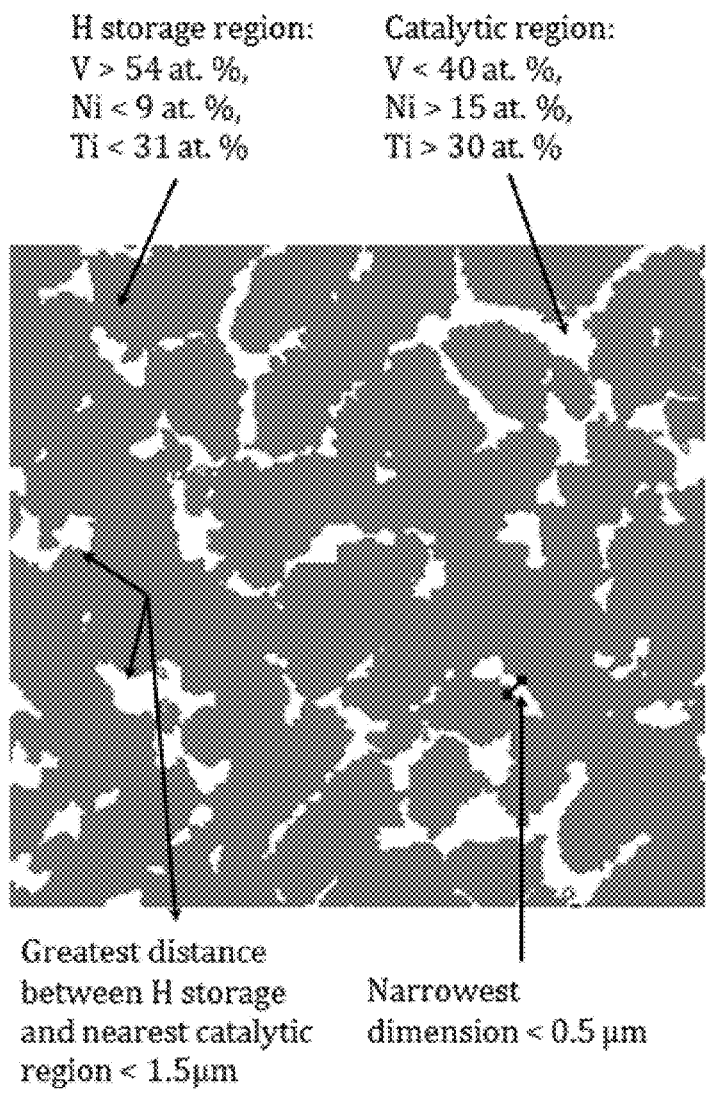
FIG. 1 is a schematic illustration of a microstructure generated in metal alloys by thermal or physical treatments according to embodiments of the present disclosure.

Certain alloy materials form metal hydrides (MH) by absorbing hydrogen and can be used for hydrogen storage and/or as electrode materials for MH batteries. For example, ABS alloys based on $LaNi_5$ have been commercialized and are widely used today.

To reduce the cost and the dependence on rare-earth metals such as La, MH materials are being developed from alternative materials, including, but not limited to, early transition metals such as scandium (Sc), titanium (Ti), vanadium (V), chromium (Cr), and manganese (Mn). Titanium-Vanadium alloys are one example. In theory, BCC vanadium is a good candidate as a hydrogen storage material, as it can form vanadium dihydride, resulting in a hydrogen gas storage capacity of 3.9 wt. %. This is equivalent to an electrochemical capacity greater than 1050 mAh/g, 3 times higher than that of ABS alloys. A group of body-centered cubic (BCC) alloys based on Ti—V solid solution have shown reasonable plateau pressures of hydrogen sorption (i.e., pressures at which the material is capable of storing/releasing hydrogen in large quantities). Ti—V solid solution have also shown improved capacity from both gas-phase storage and electrochemical cells.

More recently, BCC quaternary alloys containing titanium, vanadium, nickel, and chromium (Ti—V—Ni—Cr alloys) have been developed. See, for example, Inoue et al., Electrochimica Acta (2012), 59, 23-31, the entirety of which, including its teachings, is incorporated herein by reference. Ti—V—Ni—Cr anodes have been found to demonstrate a maximum discharge capacity of 450 mAh/g, with 90% capacity retention over 30 cycles.

While Ni is often added to Ti—V alloys for catalytic purpose, segregation is observed in the alloy. A primary region of the alloy is V-rich, while a secondary region is Ni/Ti-rich. Both the primary and secondary regions segregate at the scale from several microns to tens of microns when alloy is conventionally prepared (e.g., by arc melting and cooling at rates less than $10^3$ K/s). It has been further observed that the catalytic secondary region of these alloys facilitates hydrogen absorption and desorption, but does not absorb as much hydrogen as the primary region.

Hydrogen sorption properties may be significantly influenced by one or more of the grain size, composition, and microstructure of the alloy materials. Previously, controlling the solidification speed has been found to suppress the formation of a secondary region and to increase the primary region in Ti—V system or Mg—Ni system. See, for example, Pei et al., Int. J. Hydrogen Energy (2009), 34, 8094-8100; Pan et al., J. Alloys Comp. (2004), 364, 271-279; Wu et al., J. Alloys Comp. (2008), 466, 176-181, the entirety of each of which, including their teachings, is incorporated herein by reference. Further studies have reported that rapid solidification of via melt spinning at rates on the order of $10^6$ K/s reduces the amount of the electrocatalytic material and thus decreases performance. See Zhu, J. Alloys and Compounds, 463, (2008) 528-532 and Zhang, J. Alloys and Compounds, 370, (2004), 321-325.

Accordingly, embodiments of the present disclosure are directed to improved methods of preparing metal hydride alloy materials that exhibit improved rate performance. For example, as discussed in detail below, it has been discovered that alloy processing by at least one of thermal and physical treatment generates a refined alloy microstructure which exhibits improved kinetics when used as electrodes in MH batteries (e.g., higher capacity at a fixed discharge current) as compared to conventionally produced MH electrodes. In one embodiment, the thermal treatment includes rapid cooling of the alloy at a rate selected from the range of greater than $10^4$ K/s to less than $10^8$ K/s. In further embodiments, the physical treatment includes mechanical pulverization of the alloy after cooling. Further embodiments include both rapid cooling and mechanical pulverization.

As also discussed in detail below, modification of the alloy microstructure and particle size by rapid cooling and/or mechanical pulverization leads to significantly improved rate capability. For example, rapid cooling of alloys containing Cr has been observed to provide long cycle stability in terms of both discharge capacity and high rate dischargeability. Furthermore, embodiments of the disclosed methods may also be applied to Fe-containing samples (e.g., ferrovanadium alloys based on $Fe_{20}V_{80}$ or $Fe_{40}V_{60}$ master alloy compositions).

The microstructural refinement achieved from rapid cooling of the alloy from the melt may be may be understood with reference to the characteristic diffusion length of an atom, which is given by:

$$x = \sqrt{Dt} \qquad (5)$$

where x is diffusion length, D is diffusivity, and t is time.

Assume, for example, a quaternary alloy of Ti—V—Cr—Ni. Upon cooling from the melt to a solid, V and Ti un-mix on a BCC lattice, forming a heterogeneous microstructure, illustrated in FIG. 1. This heterogeneous microstructure includes a plurality of primary regions and a plurality of secondary regions, each possessing a BCC crystal structure, where the plurality of primary regions are mixed within a matrix of the primary region. The primary region is V-rich and suitable for hydrogen storage, while the secondary region is Ni/Ti-rich and is suitable for promoting hydrogen absorption and desorption from the alloy.

When employing rapid cooling, the alloy will solidify faster, giving less time for un-mixing of the two regions to occur and reducing t in Equation 5 above. As the time for metal atoms to diffuse is reduced, the total diffusion length x is also reduced. During physical treatment of the as-cast alloy (e.g., ball milling), the forces applied to the as-cast alloy by the ball media cause the alloy to undergo cold welding, fracture, and re-welding repeatedly, where the particle size and the size of grains within the particles are reduced. In either case, the scale of the un-mixing between the two regions is reduced, manifested as a reduction in a maximum average smallest physical dimension of the plurality of secondary regions, as well as a reduction in a maximum average separation distance between secondary regions (FIG. 1).

With further consideration of Eq. 5, improvements in the kinetics of MH alloys arising from microstructural refinement may also be understood. Continuing the example of a quaternary alloy of Ti—V—Cr—Ni, it is believed that the NiTi regions are electrocatalytically active and, when the alloy is employed in an electrode, dissociates water into H and OH— upon charging. See, for example, M. Tsukahara et al., Journal of Alloys and Compounds 253-254 (1997) 583-586; N. Krstajic et al., Electrochimica Acta 42 (1997) 323-330, the entirety of each of which, including their teachings, is incorporated herein by reference. The hydrogen then diffuses into the V-rich region for storage, where it forms a metal hydride. The opposite processes occur when the MH electrode discharges. H diffuses out of the V-rich regions to recombine with OH— at the NiTi regions in the alloy, producing $H_2O$ and an electron.

The electrode kinetics of metal hydride alloys are mainly controlled by two processes: hydrogen diffusion through the bulk alloy and charge transfer at the alloy surface. With regards to bulk diffusion of hydrogen, the reduced microstructure of the rapidly cooled alloys also reduces the total distance for hydrogen to travel to and from the NiTi regions. Thus, by reducing x in Equation 5, t is also reduced and the V-rich regions can discharge hydrogen faster. With regards to charge transfer, the reduced microstructure increases the surface to volume ratio of the NiTi/V-rich interface. As a result, the rapidly cooled alloy can discharge more electrons per unit volume per unit time, leading to higher discharge rate kinetics and a higher discharge current when compared with alloys formed by conventional techniques (e.g. arc melting) and characterized by the same method.

Figure 2A:
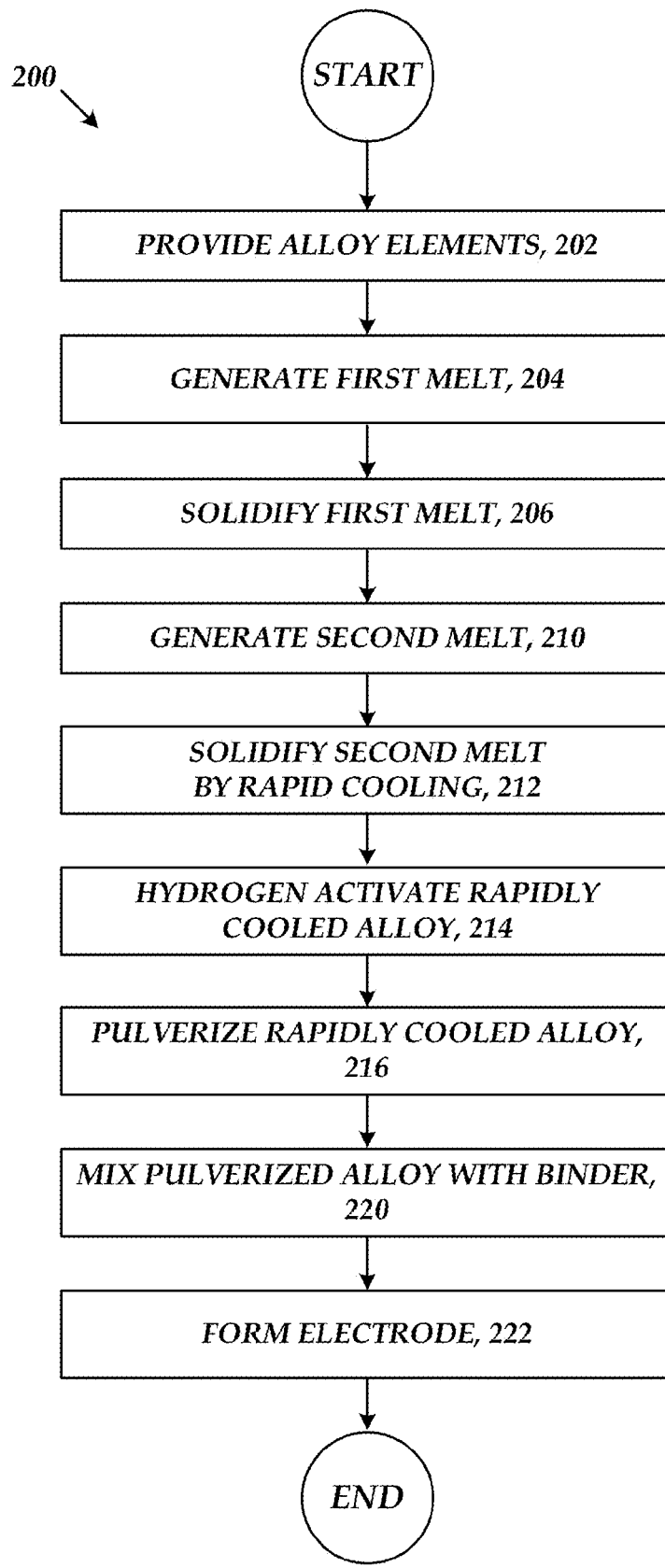
FIGS. 2A-2B are flow diagrams illustrating an embodiment a method of the present disclosure for forming metal alloys and metal hydride electrodes therefrom.
Figure 2B:
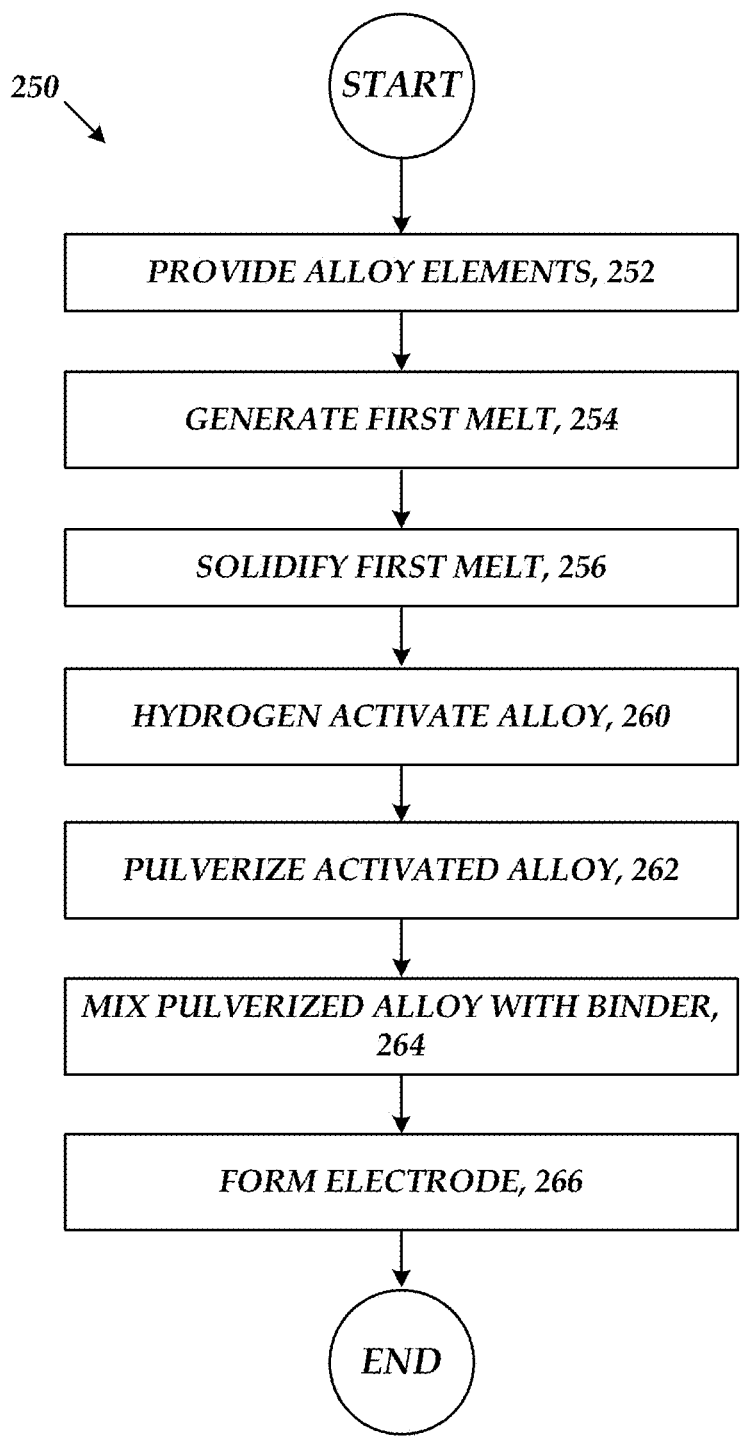

The discussion will now turn to FIGS. 2A-2B, which illustrate embodiments of methods 200, 250 of fabricating a metal alloy. As discussed in greater detail below, the method 200 of FIG. 2A is directed to fabrication of metal alloys and metal alloy electrodes having the desired microstructure formed by thermal treatment of an alloy precursor. The method 250 of FIG. 2B is directed to fabrication of metal alloys and metal alloy electrodes electrodes having the desired microstructure formed by physical treatment of an alloy precursor. It may be understood that, in certain embodiments, one or more steps may be added to, omitted from, and/or the performed in a different order than illustrated in FIGS. 2A-2B.

The method 200 begins with step 202, where the alloy elements are provided in an amount sufficient to yield a desired alloy composition. The alloy elements include at least four of titanium (Ti), chromium (Cr), vanadium (V), iron (Fe), and nickel (Ni).

In an embodiment, the metal alloy composition is given by $Ti_aV_bN_cCr_dFe_e$, where a is selected from the range of 0 at. % to 97 at. %, b is selected from the range of 0 at. % to 100 at. %, c is selected from the range of 3 at. % to 20 at. %, d is selected from the range of to 0 at. % to 20 at. %, and e is selected from the range of 0 to 20 at. %. In further embodiments, M is Fe, and the ratio of Fe/(V+Fe) is selected from the range of 0 to 0.4.

In an alternative embodiment, the metal alloy composition is $Ti_{29}V_{62-x}Cr_xNi_9$, where x=6, 9, 12, or 15. Examples may include, but are not limited to, $Ti_{29}V_{56}Cr_6Ni_9$, $Ti_{29}V_{53}Cr_9Ni_9$, and $Ti_{29}V_{50}Cr_{12}Ni_9$.

In another embodiment, the metal alloy composition is $TiV_{2.1-y}Cr_yNi_{0.3}$, where y=0.2-0.5.

In steps 204-206, a first melt is generated from the provided alloy elements. The elements may be provided in any form (e.g., plates, strips, and/or granules). The melt is subsequently solidified to form one or more first ingots. For example, the alloy elements may be heated to a temperature sufficient to melt the alloy elements. The first melt may be further held at the selected temperature facilitate mixing of the elements. The first melt is then allowed to cool until solidified, forming the one or more first ingots. The cooling rate is selected from the range of greater than $10^1$ K/s to less than $10^8$ K/s. Steps 204-206 may be optionally repeated, as necessary, in order to ensure that all of the elements have fully melted and mixed in the liquid state.

In an embodiment, melting is performed by arc melting. The alloy elements are placed in a crucible and an electrode is brought close to the alloy elements. Subsequently, a current sufficient to start an arc between the electrode and the alloy elements is applied to the electrode, heating each of the alloy elements to above its respective melting temperature and generating the first melt. In alternative embodiments, however, techniques other than arc melting may be employed to generate the first melt (e.g., induction melting, ball-milling).

In steps 210-212, one or more of the first ingots are subjected to thermal treatment to fabricate the desired metal alloy. Accordingly, in the context of the method 200, the first ingots, including a mixture of at least four of titanium (Ti), chromium (Cr), vanadium (V), iron (Fe), and nickel (Ni), serve as the precursor of the desired alloy. For example, one or more of the first ingots are re-melted in step 210 to generate a second melt. Subsequently, in step 212, the second melt rapidly cooled until solidified at a rate selected from the range of greater than $10^{4\circ}$ K/s to less than $10^8$ K/s forming second ingots having the desired refined microstructure.

In certain embodiments, rapid cooling is performed by suction casting. However, it may be understood that, in alternative embodiments, rapid cooling may be performed by other techniques including, but not limited to, liquid quenching, air quenching, gas atomization, and melt spinning. In further embodiments, the method 200 may omit steps 206-210, with the first melt being solidified by rapid cooling a rate selected from the range of greater than $10^{4\circ}$ K/s to less than $10^8$ K/s in step 212.

Following solidification by rapid cooling in step 212, the as-cooled alloy possesses a heterogeneous, microstructure having a single phase, body centered cubic (BCC) crystal structure. As illustrated in FIG. 1, the microstructure includes a plurality of primary regions (dark) and a plurality of secondary regions (light), where the plurality of secondary regions are mixed within a matrix of the primary regions. In an embodiment, at least one physical dimension (e.g., a minor radius) of the plurality of secondary regions has an maximum average value less than 1 μm. In additional embodiments, the maximum average value of the at least one physical dimension is less than 0.5 μm. For example, measurements on embodiments of alloys of the present disclosure have found the average value of the at least one physical dimension to be within the range of 0.24±0.09 μm. In further embodiments, a maximum average distance from a center of a primary region to a nearest secondary region is less than 1.5 μm. For example, measurements on embodiments of alloys of the present disclosure found this maximum average distance to be within the range of 0.97±0.3 μm.

The plurality of primary regions are V-rich, characterized by a lattice parameter selected from the range of 3.02 Å to 3.22 Å. In further embodiments, the plurality of primary regions are characterized by an amount of vanadium greater than 54 at. %. In additional embodiments, the plurality of primary regions are characterized by an amount of nickel less than 9 at. %. In other embodiments, the plurality of primary regions are characterized by an amount of titanium less than 31 at. %.

The plurality of secondary regions are Ni-rich, characterized by a lattice parameter selected from the range of 3.00 Å to 3.22 Å. In further embodiments, the plurality of secondary regions are characterized by an amount of vanadium less than 40 at. %. In additional embodiments, the plurality of secondary regions are characterized by an amount of nickel greater than 15 at. %. In other embodiments, the plurality of secondary regions are characterized by an amount of titanium greater than 30 at. %.

For example, the composition of the plurality of primary regions includes at least four of:
18 at. % to 31 at. % Ti;
54 at. % to 72 at. % V;
6 at. % to 13 at. % Cr;
2 at. % to 12 at. % Fe; and
3 at. % to 9 at. % Ni.

The composition of the plurality of secondary regions includes at least four of:
30 at. % to 50 at. % Ti;
8 at. % to 40 at. % V;
2 at. % to 5 at. % Cr;
5 at. % to 18 at. % Fe; and
15 at. % to 42 at. % Ni.

In further embodiments, the heterogeneous microstructure further includes a plurality of boundary regions extending between the plurality of primary regions and the plurality of secondary regions. The plurality of boundary regions is characterized by a lattice parameter selected from the range of 3.00 Å to 3.22 Å.

In step 214, the second ingots of the rapidly cooled alloy are subjected to a hydrogen activation process. This process facilitates mechanical breakup of the ingots. For example, in the activation process, the alloy is thermally cycled in a hydrogen environment between a maximum temperature and a minimum temperature at a selected pressure. The maximum temperature of the thermal cycling is selected from the range of 250° C. to 450° C., while the minimum temperature of the thermal cycling is selected from the range of 0° C. to 25° C. (e.g., 250° C.). The hydrogen pressure is selected from the range of 8 to 50 (e.g., 8 bar). The number of cycles may be selected as necessary to achieve a desired degree of breakup of the ingots (e.g., 5 cycles). For example, so processed, the rapidly cooled metal alloy is capable of sorbing at least 1.3 wt. % hydrogen at a pressure less than 2 atm.

In step 216, the activated alloy is subjected to mechanical pulverization to further reduce the alloy particle size. Embodiments of mechanical pulverization may include, but are not limited to, mechanical crushing, grinding, and ball milling. In certain embodiments, the mechanical pulverization is performed by ball milling. For example, when performing ball milling, the material to ball weight ratio may be selected from the range of 1:10 to 1:40. The duration of ball milling may be selected from the range of 1 h to 80 h. Following the mechanical pulverization, the pulverized alloy may be optionally sieved to filter out particles greater than a selected size. Upon completion of the pulverizing step 216, the pulverized alloy possesses a size selected from the range of 0.1 μm to 75 μm.

In further embodiments of step 216, one or more process control agents may be introduced to the alloy during pulverization. The process control agents coat the alloy particles, inhibiting cold welding and moderating the pulverization process. Examples of process control agents may include, but are not limited to, stearic acid and nickel powder.

In operations 220-222, embodiments of metal hydride electrodes are formed from the pulverized alloy. An electrode composition is prepared in step 220 by mixing the MH alloy with a conductive binder in a selected ratio. Examples of the conductive binder may include, but are not limited to, at least one of nickel, copper, and carbon. In further embodiments, the binder may include a conductive binder and one or more a polymer binders. Examples of the polymer binder may include, but are not limited to at least one of polyvinyl alcohol (PVA) and polytetrafluoroethylene (PTFE). In further embodiments, the ratio of MH alloy to the binder is selected from the range of 95:5 to 25:75. In step 222, the electrode composition is pressed into a desired shape (e.g., a pellet) on a substrate. Examples of the substrate may include, but are not limited to, Ni or Cu in forms of mesh, foil or foam.

The method 250 (FIG. 2B) illustrates a process for forming metal alloy electrodes having a refined microstructure achieved through a physical treatment. The method 250 includes providing alloy elements in step 252, generating a first melt in step 254, solidifying the first melt in step 256, hydrogen activating the pulverized alloy in step 260, pulverizing the solidified alloy in step 262, mixing the pulverized alloy with a binder in step 264, and forming an electrode in step 266. Steps 252, 254, 256, 260, 262, 264, and 266 are performed as discussed above with respect to steps 202, 204, 206, 214, 216, 220, and 222, respectively.

That is to say, the method 250 is performed similarly to the method 200 excepting that the re-melting step 210 and rapid cooling step 212 are omitted. Accordingly, in the method 250, the alloy as-cooled in step 256 serves as the alloy precursor and is subject to mechanical treatment by hydrogen activation and pulverizing for use in forming the metal hydride electrode.

EXAMPLES

In the examples below, vanadium-based metal alloys and metal hydride electrodes were prepared by rapid cooling according to the above-disclosed methods in order to determine the effect of solute concentration on the alloy microstructure, kinetics, and electrode lifetime. Reference samples having identical compositions were further prepared in a similar fashion, except that the cooling rate of these samples was $10^1$-$10^3$ K/s. These reference samples are referred to herein as "conventionally cooled" in the examples for comparison.

The examined metal alloys possessed the following compositions:

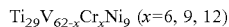
$Ti_{29}V_{62-x}Cr_xNi_9$ (x=6, 9, 12)

$TiV_{2.1-y}Cr_yNi_{0.3}$ (y=0.2-0.5)

Alloy Microstructure—Conventional Cooling Vs. Rapid Cooling:

The microstructures of conventionally cooled and rapidly cooled MH alloys were examined by scanning electron microscopy (SEM), energy dispersive X-ray spectroscopy (EDS), and X-ray diffraction (XRD).

(a) $Ti_{29}V_{56}Cr_6Ni_9$, $Ti_{29}V_{53}Cr_9Ni_9$, and $Ti_{29}V_{50}Cr_{12}Ni_9$ Composite SEM and EDS images of the conventionally cooled and rapidly cooled samples of $Ti_{29}V_{56}Cr_6Ni_9$ and $Ti_{29}V_{53}Cr_9Ni_9$ are illustrated in FIGS. 3A, 3C and 3B, 3D, respectively, with the conventionally cooled samples on the top and the rapidly cooled samples on the bottom. Segregation into a plurality of primary V-rich regions and a plurality of secondary Ni-rich regions is apparent in the conventionally cooled samples, yet the rapidly cooled samples appeared to show no segregation at the spatial resolution of the SEM.

With reference to Equation 5, the diffusion length for chemical un-mixing, x, is proportional to $(Dt)^{1/2}$. Given that the cooling rate governs the diffusion time, it is anticipated that the rapidly cooled samples will exhibit diffusion lengths 10 to 100 smaller than the conventionally cooled samples. As illustrated in the micrographs of conventionally cooled samples, FIGS. 2A and 2C, Ni rich regions on the scale of tens of microns are visible, meaning that Ni rich regions in the rapidly cooled sample are expected to be no larger than 1 μm.

Figure 4:
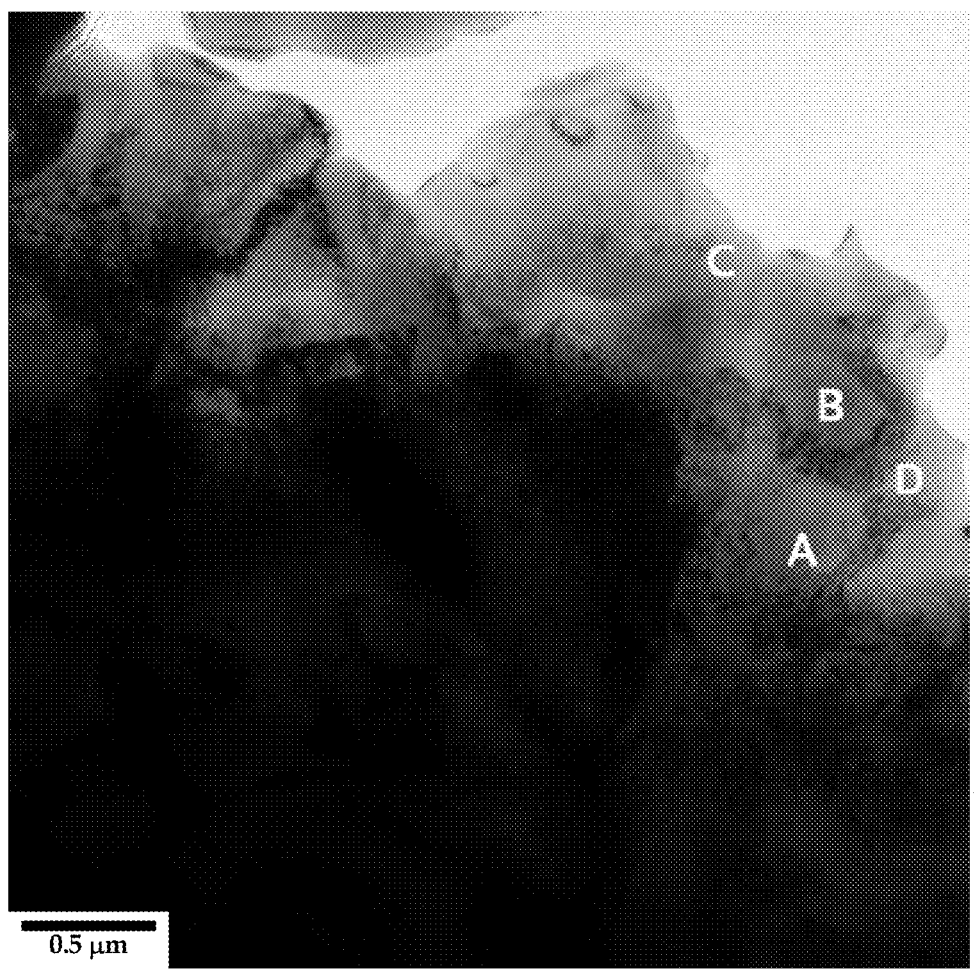
FIG. 4 is a bright field transmission electron micrograph of an embodiment of a rapidly cooled T-V—Cr—Ni alloy.
Figure 5:
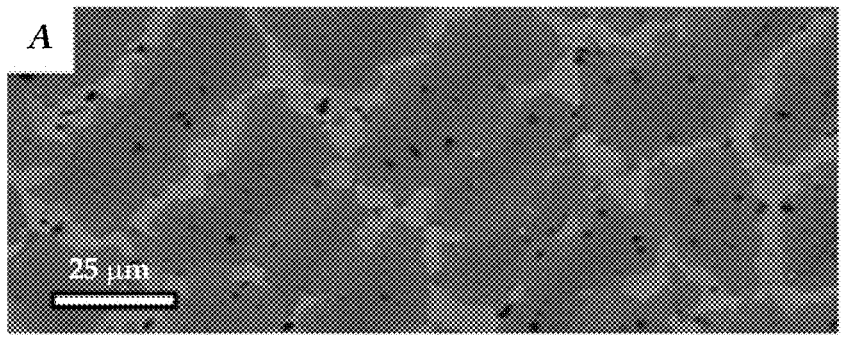
FIG. 5: A-D are scanning electron micrographs of Ti—V—Cr—Ni alloys processed by conventional cooling (A, B) and embodiments of the disclosed rapid cooling (C, D)
Figure 5:
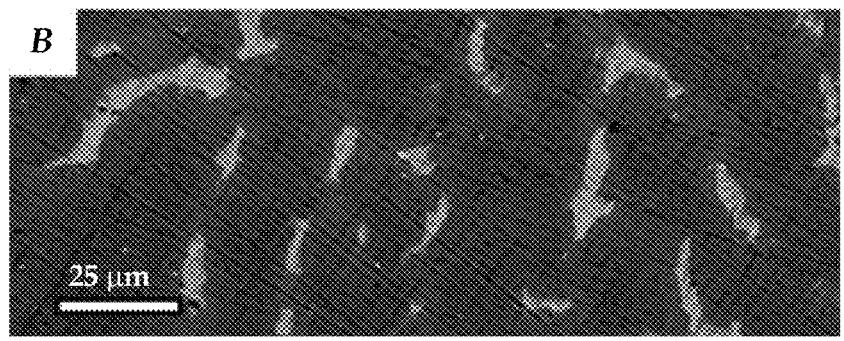
Figure 5:
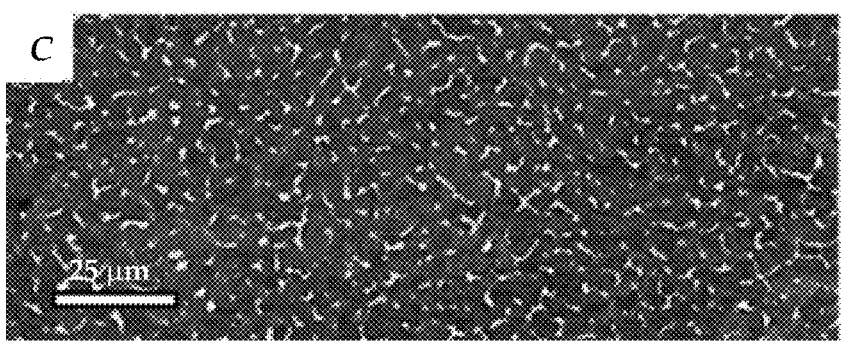
Figure 5:
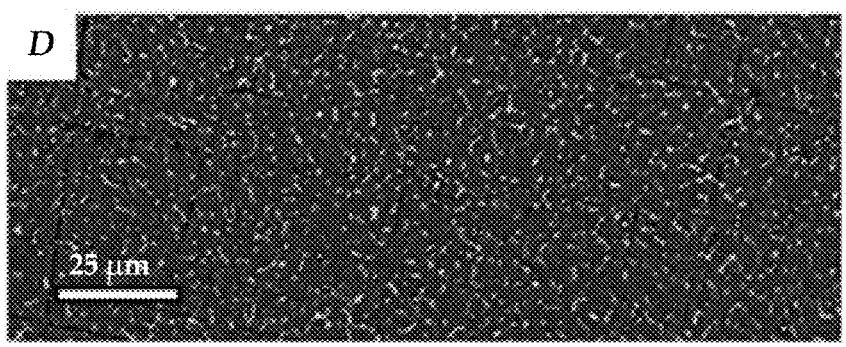

As regions of this size are difficult to distinguish due to resolution limits in SEM, transmission electron microscopy (TEM) was performed on a rapidly cooled sample with composition $Ti_{29}V_{50}Cr_{12}Ni_9$. A micrograph of this sample is presented in FIG. 4. Potential crystallites (grains) were identified by tilting the sample, and compositional point analysis was performed in each crystallite, indicated by the letters on FIG. 4. Point C contained 41.33 at. % Ti and 50.01% Ni, meaning that small regions of the electrocatalytic Ni—Ti region may exist even in the rapidly cooled samples. The grain associated with point C is a little larger than 1 μm in diameter, which matches well with the $(Dt)^{1/2}$ relationship for diffusion length.

(b) $TiV_{1.7}Ni_{0.3}Fe_{0.4}$, $TiV_{1.9}Ni_{0.3}Cr_{0.2}$, $TiV_{1.7}Ni_{0.3}Cr_{0.4}$, $TiV_{1.9}Ni_{0.3}Cr_{0.2}$

A more detailed characterization of the alloy microstructure was performed on conventionally cooled $TiV_{1.7}Ni_{0.3}Fe_{0.4}$ and $TiV_{1.7}Ni_{0.3}Cr_{0.4}$ and rapidly cooled $TiV_{1.7}Ni_{0.3}Cr_{0.4}$ and $TiV_{1.9}Ni_{0.3}Cr_{0.2}$. Representative micrographs captured during SEM using backscattered electron intensity (BEI) imaging under high current conditions are illustrated in FIGS. 5A-5D, respectively. It may be understood that the plurality of Ni-rich secondary regions show up as white in the micrographs because Ni is the heaviest atom and, therefore, backscatters the highest intensity of electrons. For comparison purposes it may be understood that the use of Fe, rather than Cr, is not expected to change the nature of un-mixing in the alloy and should show a similar microstructure under conventional cooling $TiV_{1.7}Ni_{0.3}Fe_{0.4}$. Accordingly, this sample is directly comparable to $TiV_{1.7}Ni_{0.3}Cr_{0.4}$ and $TiV_{1.9}Ni_{0.3}Cr_{0.2}$.

Point compositional analysis of the light regions (i.e., secondary regions) and dark regions (i.e., primary regions) was performed via energy dispersive x-ray spectroscopy (EDS) and summarized in Table 1, below.

TABLE 1

Elemental composition ranges for primary and secondary regions for rapidly cooled $TiV_{1.7}Ni_{0.3}Fe_{0.4}$, $TiV_{1.7}Ni_{0.3}Cr_{0.4}$, $TiV_{1.7}Ni_{0.3}Cr_{0.4}$ and $TiV_{1.9}Ni_{0.3}Cr_{0.2}$

| Element | Primary region (%) | Secondary Region (%) |
|---|---|---|
| Ti | 18-31 | 30-50 |
| V | 54-72 | 8-40 |
| Ni | 3-9 | 15-42 |
| Cr | 6-13 | 2-5 |
| Fe | 2-12 | 5-18 |

From Table 1, it may be observed that that the primary regions are Ti—V rich while the secondary regions are Ti—Ni rich. These results confirm that rapid cooling promotes un-mixing and refines the microstructure, but does not eliminate, compositional variations in these alloys.

As discussed above, it is anticipated that the electrode kinetics of metal hydride alloys are mainly controlled by hydrogen diffusion through the bulk alloy and charge transfer at the alloy surface. The average diameter of the secondary regions is expected to correspond to the maximum diffusion length of hydrogen from the catalytic second region to the hydrogen storage primary region. Furthermore, half the distance separating secondary regions from one another is expected to correspond to the maximum distance necessary for hydrogen to diffuse and desorb upon discharge (i.e., the distance from the center of a V-rich primary region to an Ni-rich secondary region). Accordingly, measurements of the average second region diameter and average second region separation can provide a preliminary assessment of how well or poorly an MH alloy may perform as an electrode.

These measurements are summarized in Table 2, where the width of Ni-rich secondary regions is assumed as the shortest diameter across the secondary region.

TABLE 2

Average short axis diameter and average half separation for secondary regions of $TiV_{1.9}Ni_{0.3}Cr_{0.2}$, $TiV_{1.9}Ni_{0.3}Cr_{0.2}$, $TiV_{1.7}Ni_{0.3}Cr_{0.4}$

| Sample | Short axis diameter (μm) | ½ Separation (μm) |
|---|---|---|
| Conventionally cooled $TiV_{1.9}Ni_{0.3}Cr_{0.2}$ | 1.66 ± 0.64 | 5.66 ± 3.28 |
| Rapidly cooled $TiV_{1.9}Ni_{0.3}Cr_{0.2}$ | 0.24 ± 0.09 | 0.97 ± 0.29 |
| Rapidly cooled $TiV_{1.7}Ni_{0.3}Cr_{0.4}$ | 0.24 ± 0.09 | 0.97 ± 0.3 |

From Table 2, it is observed that the average short-axis diameter of the secondary Ni-rich regions in the rapidly cooled samples is 0.24±0.09 more than 6× smaller than the average value measured for the conventionally cooled samples, 1.66±0.64 Furthermore, the average measured distance between secondary Ni-rich regions in the rapidly cooled sample is 0.97±0.3 as compared to 5.66±3.28 μm in the conventionally cooled sample, also a nearly 6× reduction.

As illustrated in Equation 5, the diffusion length x goes as $(Dt)^{1/2}$ with D being the diffusivity and t the time for diffusion. Using the average measured diffusion lengths reported above and assuming similar diffusivities between the two samples, it may be predicted that diffusion from the secondary Ni-rich regions to the primary V-rich regions occurs 48 times faster for the rapidly cooled samples, as compared to the conventionally cooled samples. Diffusion from the center of the primary V-rich regions, which corresponds to a full discharge, is 34 times faster in the rapid cooled sample, as compared to the conventionally cooled samples. While these estimates do not take into account any interface effects between the two regions, they provide an useful way to understand the improved high rate discharge capacity observed in the rapid cooled samples, discussed in greater detail below.

Kinetic Studies—Conventional Cooling Vs. Rapid Cooling for Ti—V—Cr—Ni Alloys:

Conventionally cooled and rapidly cooled alloys of $TiV_{1.7}Cr_{0.4}Ni_{0.3}$ were further subjected to kinetic testing to compare their performance. As discussed in greater detail below, these measurements demonstrate that the rapidly cooled alloys exhibit discharge capacity that is comparable to conventionally cooled alloys. Concurrently, the rapidly cooled alloys demonstrate improved discharge rate.

(a) Discharge Capacity:

Electrochemical cycling experiments were conducted in a half cell containing embodiments of the MH electrode, 30% aqueous KOH electrolyte, an $Ni(OH)_2$ counter electrode, and, optionally, an Hg/HgO reference electrode. The MH electrode was charged at 100 mA/g and discharged three times at 167 mA/g, 50 mA/g, and 10 mA/g; each to a cut-off voltage of −0.7V vs. Hg/HgO.

Figure 6A:
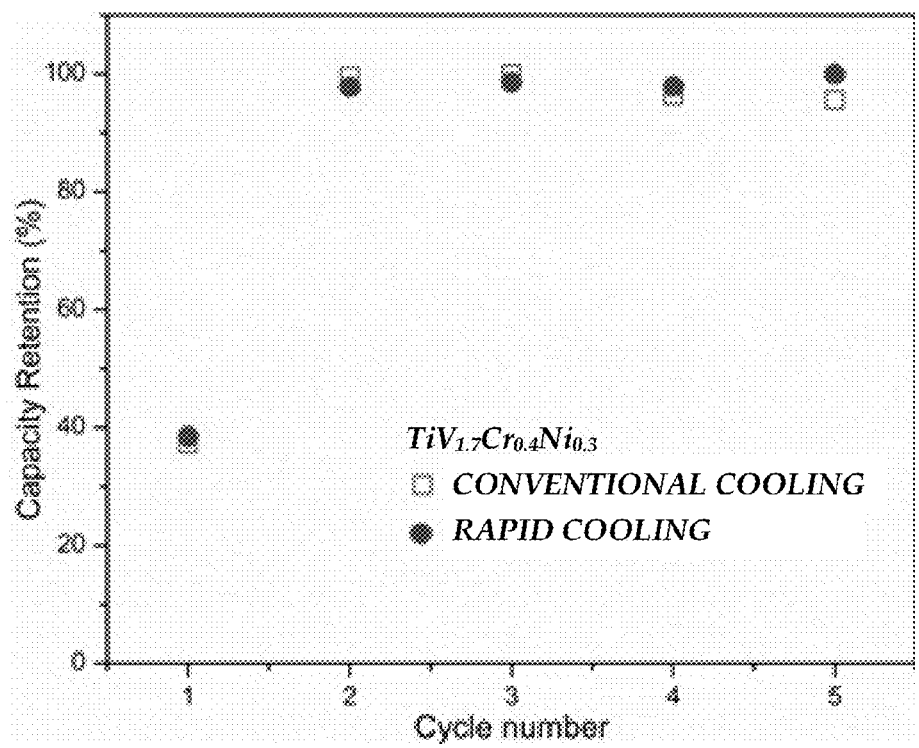
FIGS. 6A-6B are plots of capacity retention and specific discharge capacity as a function of cycle number for Ti—V—Cr—Ni alloys processed by conventional cooling and embodiments of the disclosed rapid cooling.

FIG. 6A illustrates the discharge capacity retention measured as a function of cycle during the first five cycles of $TiV_{1.7}Cr_{0.4}Ni_{0.3}$ alloys prepared by conventional cooling and rapid cooling. For both samples, the discharge capacity reaches the maximum and stabilizes after the first cycle. It is worth noting that these alloys were previously activated by several gas-phase hydrogen absorption/desorption cycles. Nevertheless, the results show that the electrochemical activation process of the $TiV_{1.7}Cr_{0.4}Ni_{0.3}$ alloy appears to be facile.

Figure 6B:
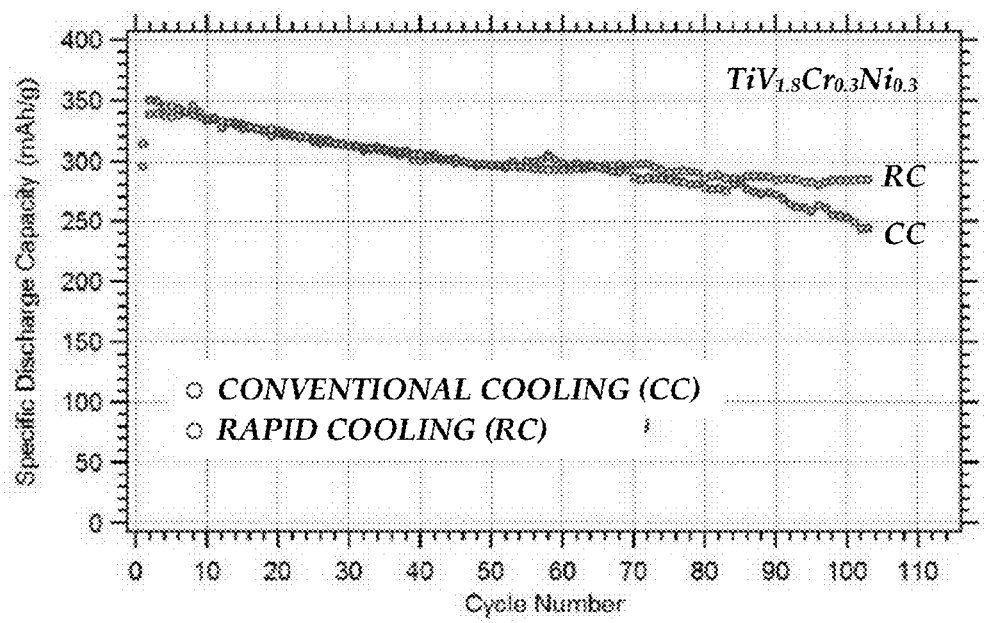

FIG. 6B illustrates specific discharge capacity retention measured as a function of cycle for 100 cycles of $TiV_{1.8}Cr_{0.3}Ni_{0.3}$ alloys prepared by conventional cooling and rapid cooling. When cycled in half cells, anodes fabricated with the rapid cooled BCC materials give similar discharge capacity for the first 100 cycles. For example, the rapidly cooled electrodes are capable of discharging at least 65% of their total capacity at 167 mA/g for at least 100 cycles.

Figure 6C:
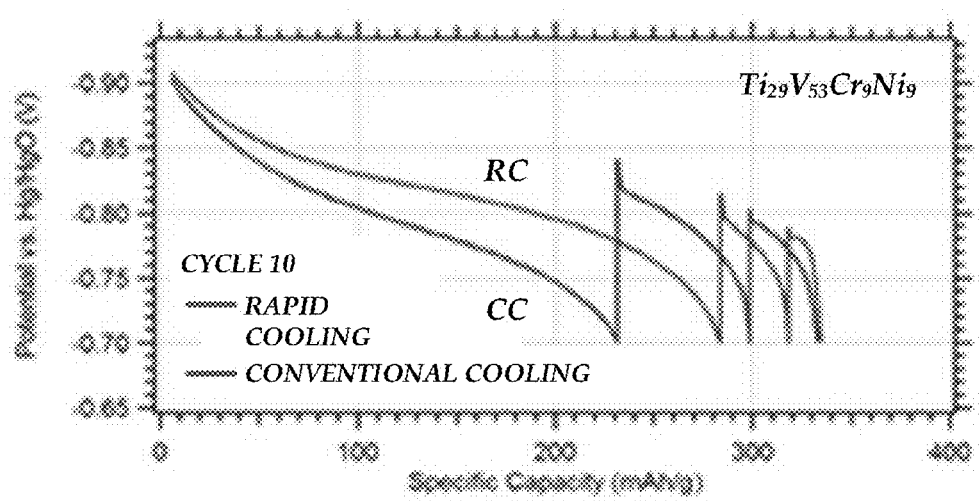
FIGS. 6C-6E are data plots of potential as a function of specific capacity during a three step discharge for Ti—V—Cr—Ni alloys processed by conventional cooling and embodiments of the disclosed rapid cooling at the $10^{th}$ cycle (FIG. 6C), $20^{th}$ cycle (FIG. 6D), and $40^{th}$ cycle (6E)
Figure 6D:
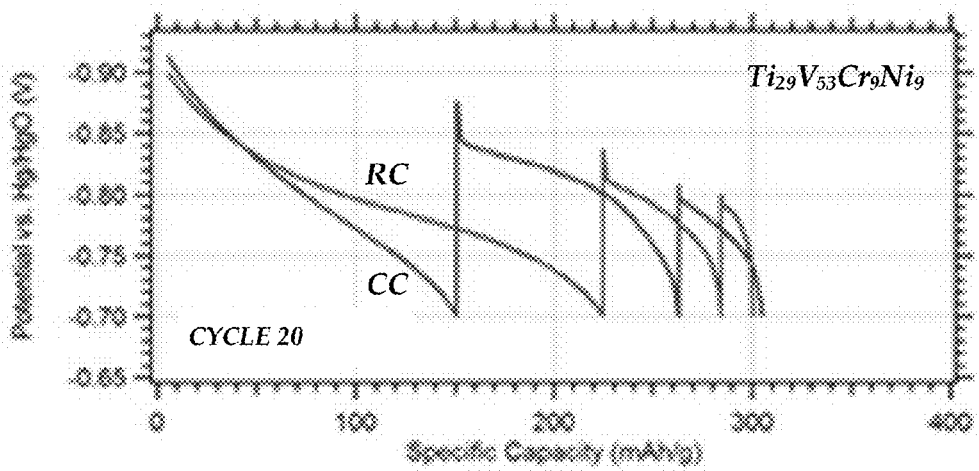
Figure 6E:
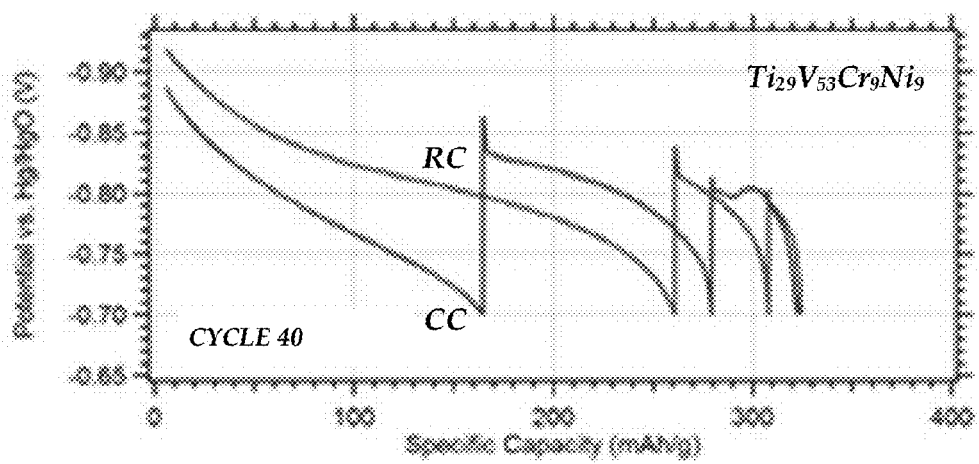

However, as observed in FIGS. 6C-6E, at each cycle, the anode of the rapid-cooled BCC alloy consistently discharges with 20%-40% more capacity during the high-rate step (167 mA/g, ~2 h, 1st step in FIGS. 6C-6E). These tests provide direct evidence that the rapidly cooled samples have better reaction kinetics than the conventionally cooled samples.

Additional measurements of discharge capacity for $TiV_{2.1-x}Ni_{0.3}Cr_x$ alloys are illustrated in FIGS. 6F-6I for alloys of Cr=0.2 (FIG. 6F), Cr=0.3 (FIG. 6G), Cr=0.4 (FIG. 6H), and Cr=0.5 (FIG. 6I). The three discharge currents are 167 mA/g, 50 mA/g, and 10 mA/g. It may be observed that least 350 mAh/g electrochemical capacity is realized at discharge currents greater than or equal to 10 mA/g.

Figure 7A:
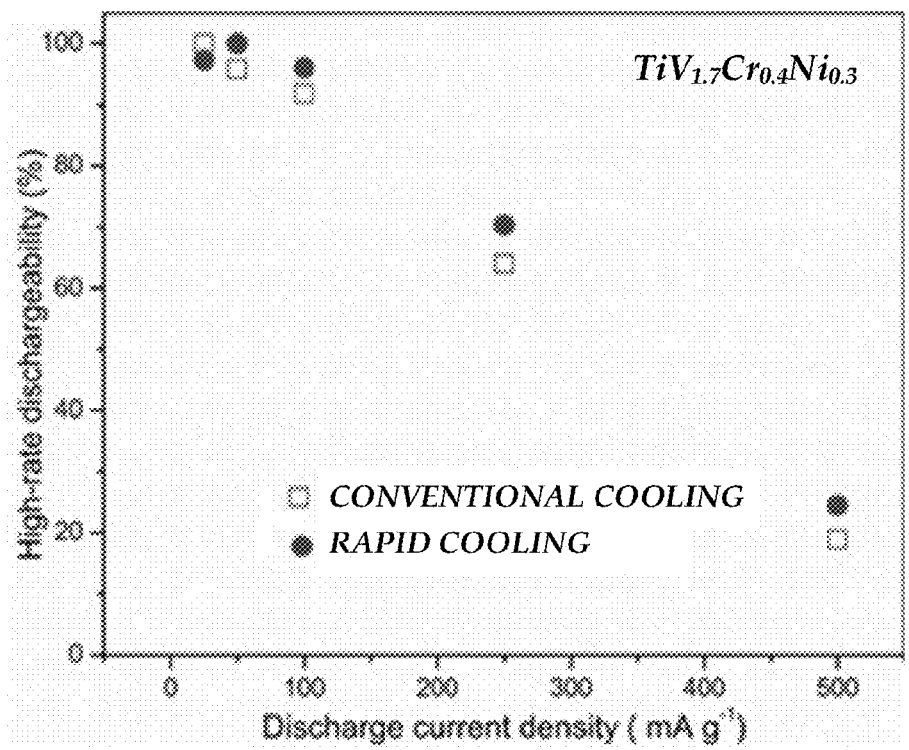
FIGS. 7A-7B are data plots of high rate dischargeability (HRD) for Ti—V—Cr—Ni alloys processed by conventional cooling and embodiments of the disclosed rapid cooling.
Figure 7B:
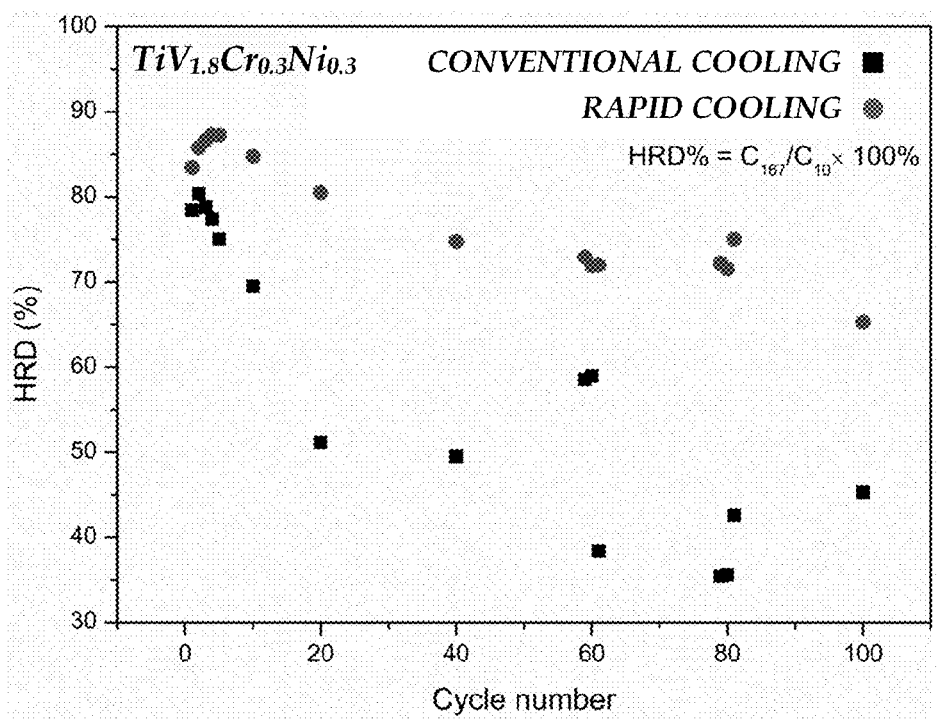

(b) High Rate Dischargeability (HRD):

In order to further investigate the reaction kinetics of the MH alloys, measurements of high-rate dischargeability (HRD) were performed on $TiV_{1.7}Cr_{0.4}Ni_{0.3}$ and $TiV_{1.8}Cr_{0.3}Ni_{0.3}$ alloys prepared by conventional cooling and rapid cooling (FIGS. 7A and 7B, respectively). HRD is calculated as shown in Equation (6):

$$HRD = \frac{C_d}{C_{max}} \times 100 \qquad (6)$$

where $C_d$ is the discharge capacity at a specific current density and $C_{max}$ is the maximum of $C_d$. It can be seen in FIG. 7A that rapid solidification moderately improves HRD at high rate. As further illustrated in FIG. 7B, the drop in HRD with increasing cycles is significantly less in the rapidly cooled alloys as compared to the conventionally cooled alloys. For example, after reaching an equilibrium state (e.g., after 5 cycles), the rapidly cooled alloys exhibit an increase in HRD of 10% or more by the fifth discharge cycle. This is further investigated by electrode kinetic studies discussed below.

(c) Electrode Kinetics:

The electrode kinetics of metal hydride alloys are mainly controlled by both the charge transfer process at the alloy surface and the hydrogen diffusion process inside the bulk alloy particles. In this study, linear polarization was employed to quantify the charge transfer, while anodic polarization was employed to quantify bulk diffusion.

Figure 8:
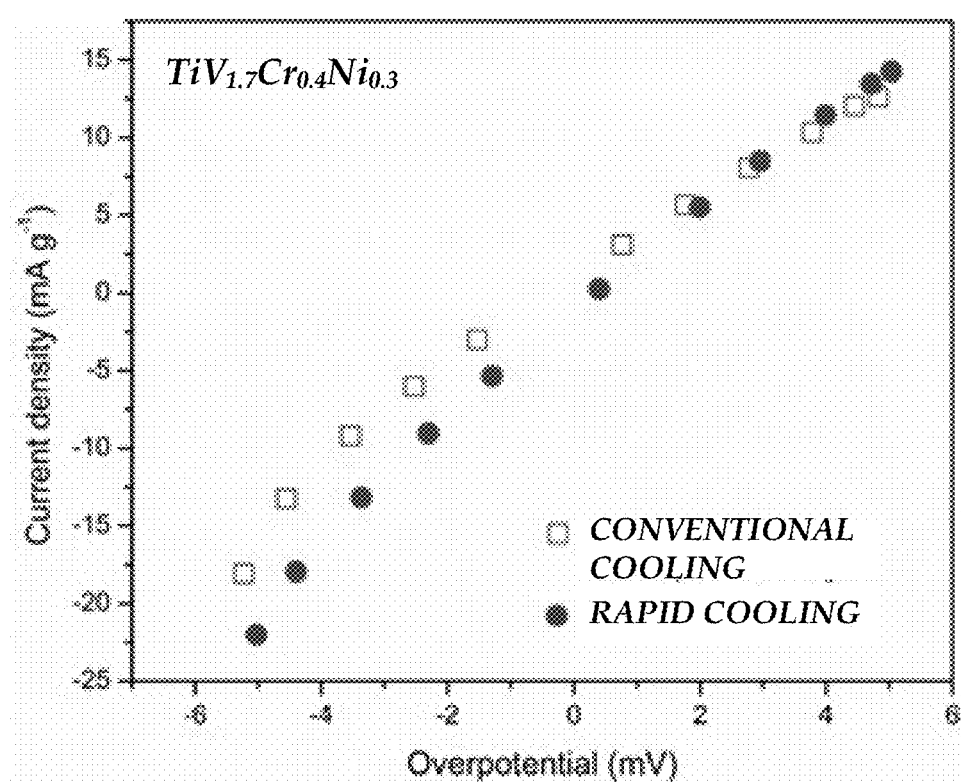
FIG. 8 is a linear polarization data plot of current density as a function of potential for Ti—V—Cr—Ni alloys processed by conventional cooling and embodiments of the disclosed rapid cooling.

FIG. 8 shows the linear polarization curves of the $TiV_{1.7}Cr_{0.4}Ni_{0.3}$ alloys. The slope of the curve can be related to the kinetics of the charge transfer process at the alloy surface. It can be seen that the rapid cooling sample shows slightly higher charge transfer kinetics than the conventionally cooled sample. Exchange current density ($i_0$) can be calculated from the slope of the curve using Equation 7:

$$i_0 = \frac{i_d RT}{f\eta} \qquad (7)$$

where R is the ideal gas constant, T is absolute temperature, F is the Faraday constant, and η is overpotential.

Figure 9:
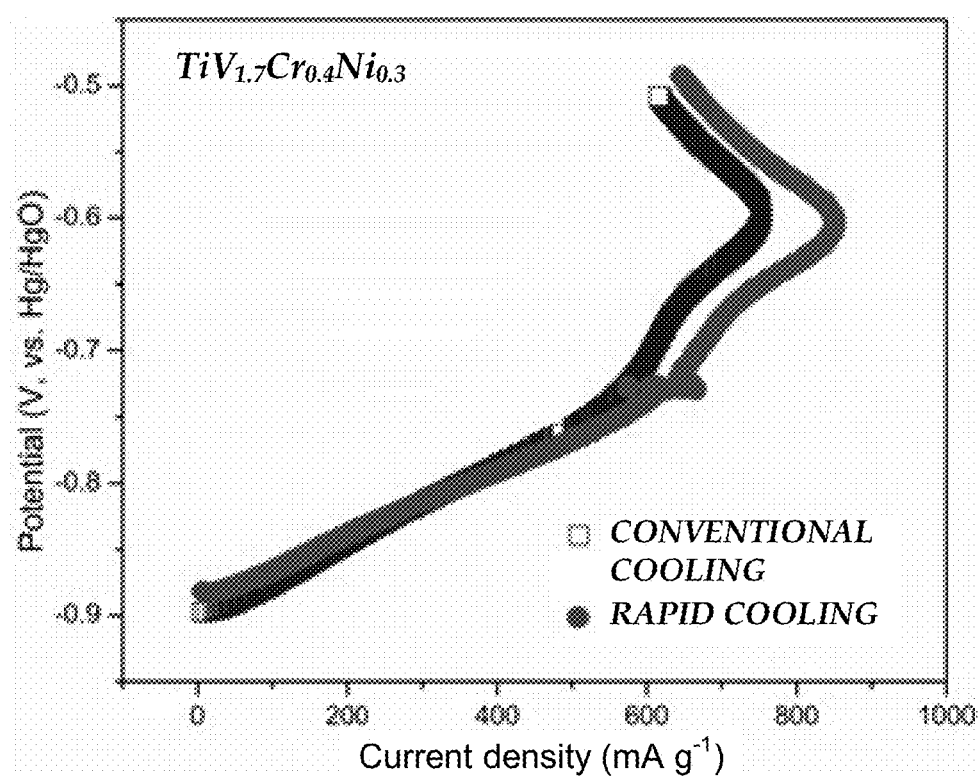
FIG. 9 is a anodic polarization data plot of potential as a function of current density for Ti—V—Cr—Ni alloys processed by conventional cooling and embodiments of the disclosed rapid cooling.

Furthermore, limiting current density can be obtained from anodic polarization curves, which is related to the bulk diffusion process. As can be seen from FIG. 9, the limiting current density (maximum current density during anodic voltage scan) of the rapidly cooled sample is higher than that of the conventionally cooled sample.

The kinetic information of the $TiV_{1.7}Cr_{0.4}Ni_{0.3}$ alloy electrodes is summarized in Table 3.

TABLE 3

Electrode kinetics of $TiV_{1.7}Cr_{0.4}Ni_{0.3}$ alloy electrodes

| Sample | HRD (%) $i_d$ = 250 mA/g | $i_0$ (mA/g) | $I_L$ (mA/g) |
|---|---|---|---|
| Conventionally cooled | 64 | 75 | 754 |
| Rapidly cooled | 70 | 91 | 851 |

In general, the rapidly cooled sample shows an improvement of at least 10%, as compared to the conventionally cooled sample, in both limiting current density and exchange current density, which may be ascribed to the refined microstructure and thus shorter diffusion length for hydrogen.

Figure 10:
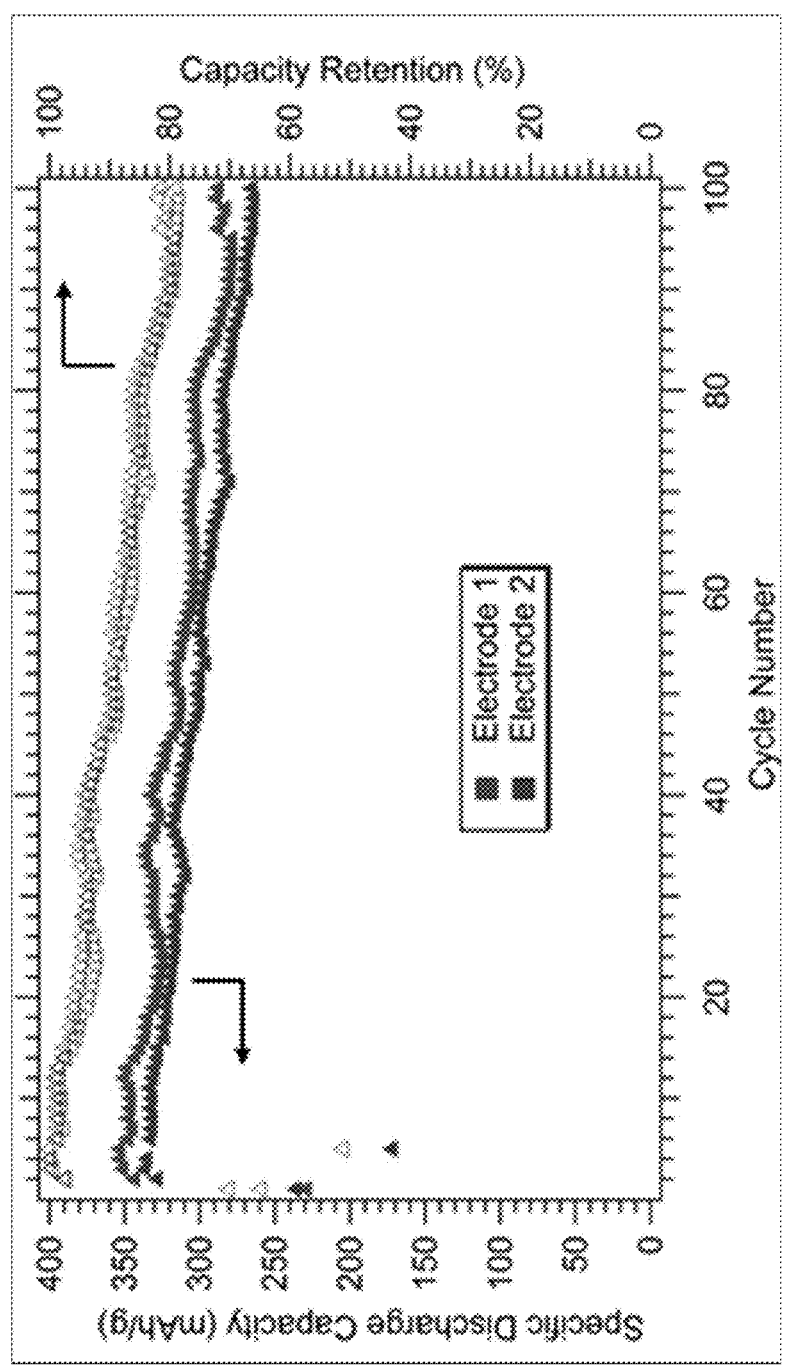
FIG. 10 is a data plot of specific discharge capacity and capacity retention as a function of cycle number for Ti—V—Cr—Ni alloys processed by conventional cooling.

(d) Electrode Lifetime:

Several cells were prepared and cycled 100 times for the purpose of determining the cause of capacity fade with cycle number illustrated with respect to FIG. 6B. All electrodes were prepared as a 25/75 mix of active material/Ni binder and cycled with an 8 hour charge at −100 mA/g, followed by a 3 step discharge of +167 mA/g, +50 mA/g, +10 mA/g. Measurements of specific discharge capacity and capacity retention versus cycle number for two representative electrodes of composition $TiV_{1.7}Cr_{0.4}Ni_{0.3}$ are illustrated in FIG. 10.

The cells were disassembled after 100 cycles and the electrodes washed with deionized (DI) water. The electrode material still remaining on the current collector was scraped off for further analysis. First, the remaining material was weighed to determine the amount of material loss. Table 4 below compares the percentage of mass remaining on the current collector to the percentage of maximum capacity left at the 100th cycle for each electrode.

TABLE 4

Mass Loss and Capacity Loss - $TiV_{1.7}Cr_{0.4}Ni_{0.3}$ Electrodes After 100 Cycles

| Electrode | % Mass Remaining | % Max Capacity At Cycle 100 |
|---|---|---|
| 1 | 83.7 | 79.4 |
| 2 | 78.1 | 78.3 |

From Table 4, it may be observed that the mass loss and capacity fade are nearly equivalent for both electrodes. This indicates that the capacity fade is likely due to loss of active material from the electrode, rather than corrosion (e.g., oxidation) of the electrolyte.

Figure 11:
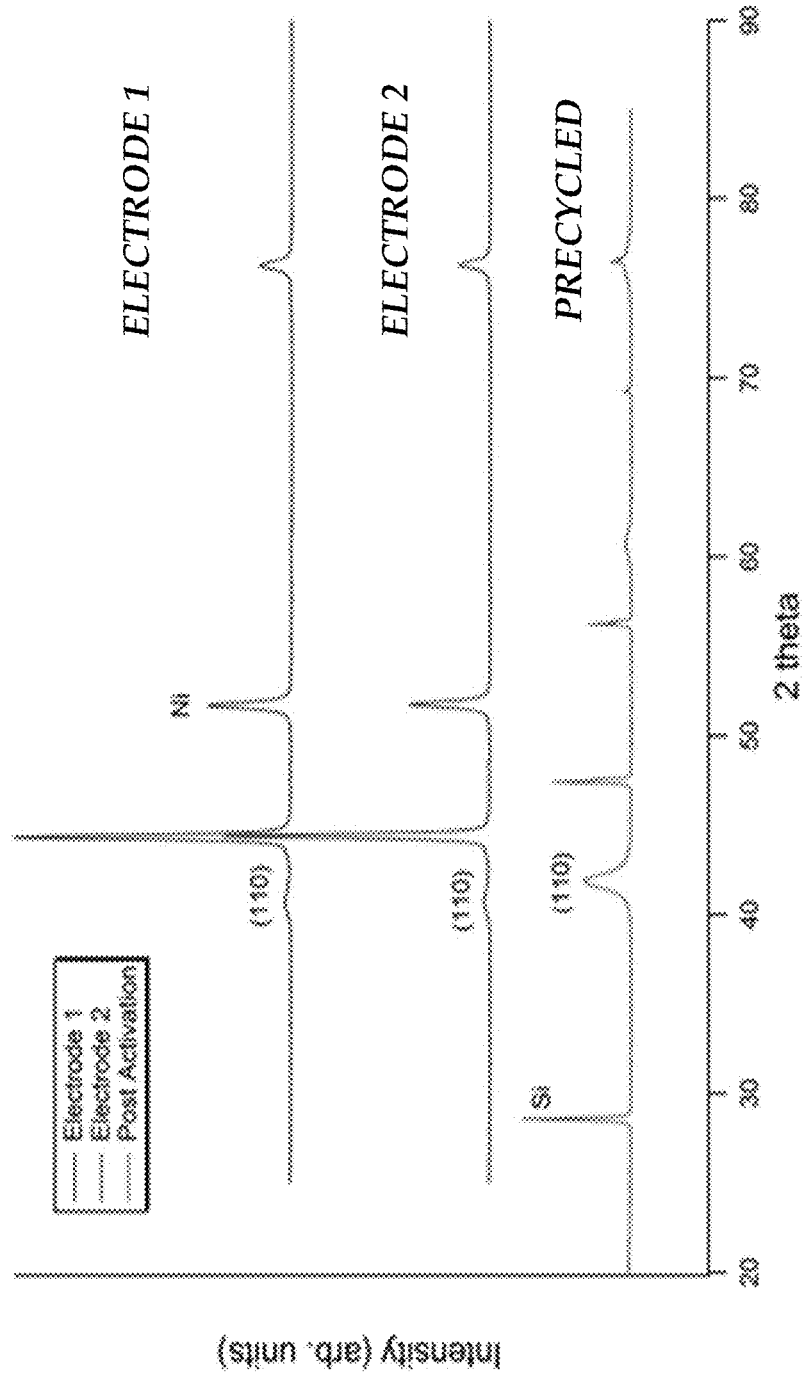
FIG. 11 is an X-ray diffractogram of pre- and post-cycled Ti—V—Cr—Ni alloys processed by conventional cooling.

The structure of the cycled electrode material was examined by x-ray diffraction to determine whether any observable oxide peaks formed, which would be indicative of corrosion taking place. Diffractograms of the cycled material, as well as activated BCC alloy material prior to electrochemical cycling ("post-activation"), are shown in FIG. 11.

The sharp peaks observed for the cycled electrodes 1 and 2 (top and middle, respectively) are due to the FCC Ni binder. However, the (110) peak from the BCC active material is also present. There are no observable peaks that would be associated with the existence of an oxide. When compared to the pre-cycled material (bottom), a slight shift of the (110) peak to a lower angle is observed. This is likely due to lattice broadening from residual hydrogen in the cycled material.

Figure 12:
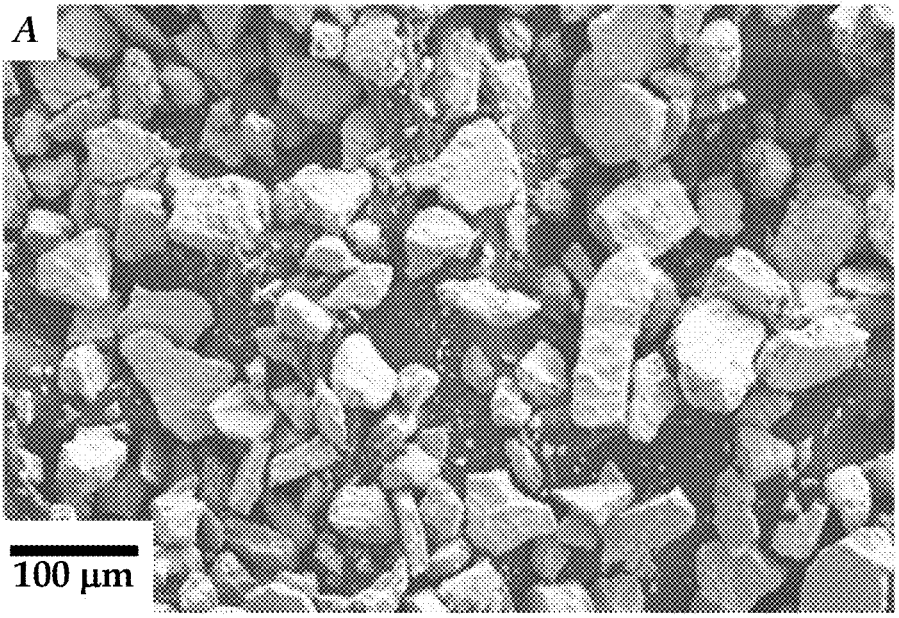
FIG. 12: A-B are scanning electron micrographs of pre- and post-cycled Ti—V—Cr—Ni alloys processed by conventional cooling.
Figure 12:
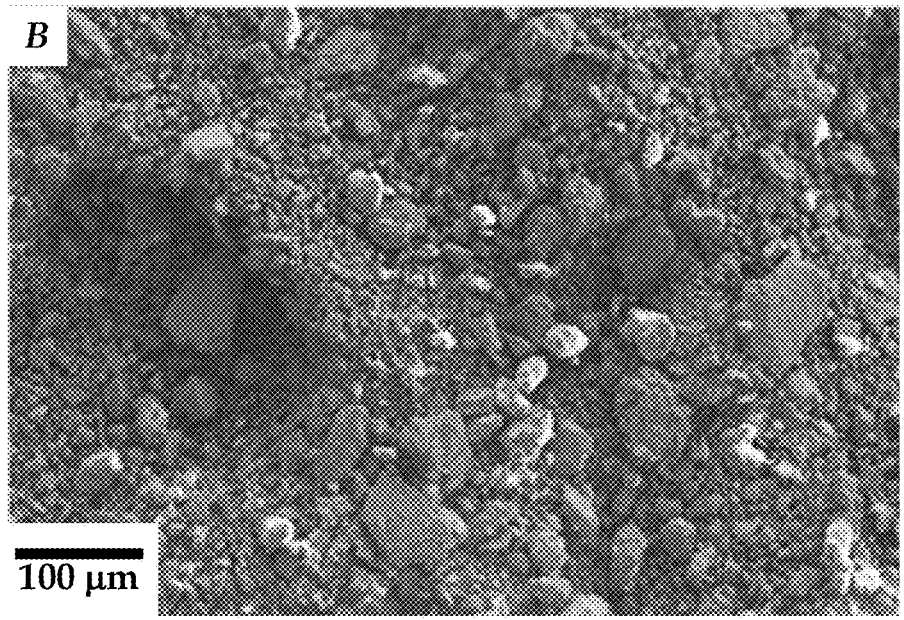
Figures 13, 14:
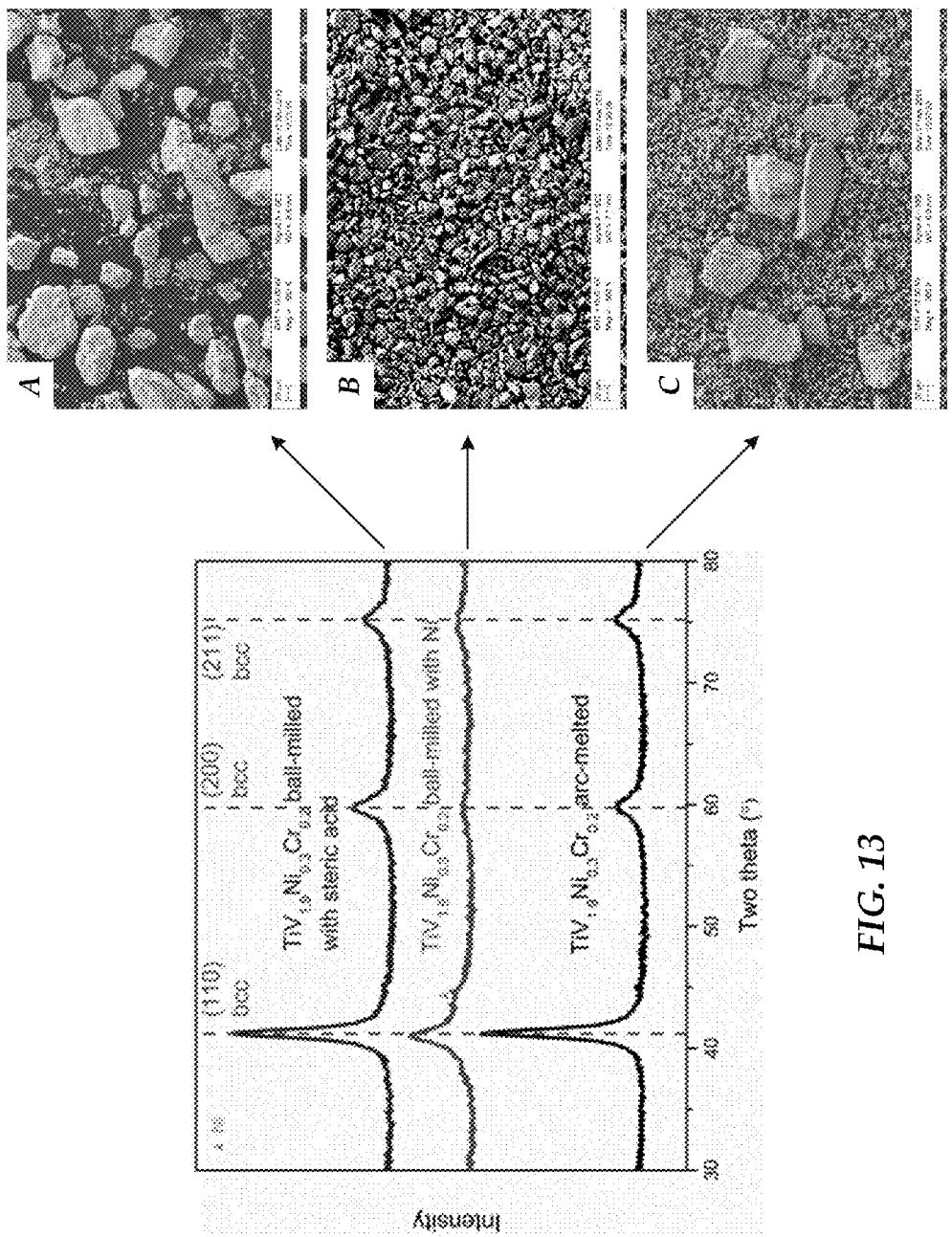
FIG. 13 is an X-ray diffractogram of as-cast and ball milled Ti—V—Cr—Ni alloys.
FIG. 14: A-C are scanning electron micrographs of as-cast and ball milled Ti—V—Cr—Ni alloys.

The microstructure of the pre- and post-cycled materials was further examined by scanning electron microscope (SEM). FIG. 12A is an image of the $TiV_{1.7}Cr_{0.4}Ni_{0.3}$ material prior to mixing with the nickel binder. The size of the particles is on the order of tens of microns. An image of the post-cycled material is presented in FIG. 12B. The scale of both SEM images is the same and it may be observed there has been significant decrepitation of the active material particles.

It may be noted that several particles exhibit a diameter less than 10 microns. From the discussion above, this is the scale of unmixing between NiTi and V rich regions in the conventionally cooled samples. The Ni binder used in electrode fabrication consists of particles a few hundred nanometers in diameter, which causes the BCC particle surface to appear rougher than it truly is. Additionally, larger particles showed some evidence of rounding out of sharp edges, indicative of some degree of corrosion occurring.

The SEM results give some insight into the rate improvement of the BCC materials produced via rapid cooling over those produced via conventional cooling. As previously reported, electrodes fabricated with the rapidly cooled material discharge more capacity at higher current rates. The scale of unmixing between NiTi and V rich regions in the suction cast materials was on the order of 1 μm. It might be possible that decrepitation of the particles to sub ten micron size causes some conventionally cooled particles to lose the NiTi electrocatalytic region, thus reducing the charge and discharge kinetics. The much finer microstructure of the rapidly cooled particles would retain more NiTi regions per particle as decrepitation occurs. As a result, we expect overall faster kinetics for electrodes prepared using the rapidly cooled MH materials.

Additionally preliminary results indicate that capacity fade caused by corrosion may not be as large as initially predicted. It appears that the majority of the fade is due to the loss of electrical contact between the active material and current collector.

Ball Milling:

Alloy materials formed according to embodiments of method 250 and having compositions of $TiV_{1.9}Cr_{0.2}Ni_{0.3}$ were further investigated to explore the influence of alloy processing by physical treatment on microstructure and electrode performance.

Particle Size Reduction:

In this experiment, ball-milling was done with 1:20 material to ball weight ratio. The material was prepared by mixing bcc alloy with 4~5 wt. % nickel or stearic acid powder as dispersion agent. The milling was performed with Fritsch PULVERISETTE 7 premium line planetary micro mill, at rpm of 400 for 10 h.

Figure 15:
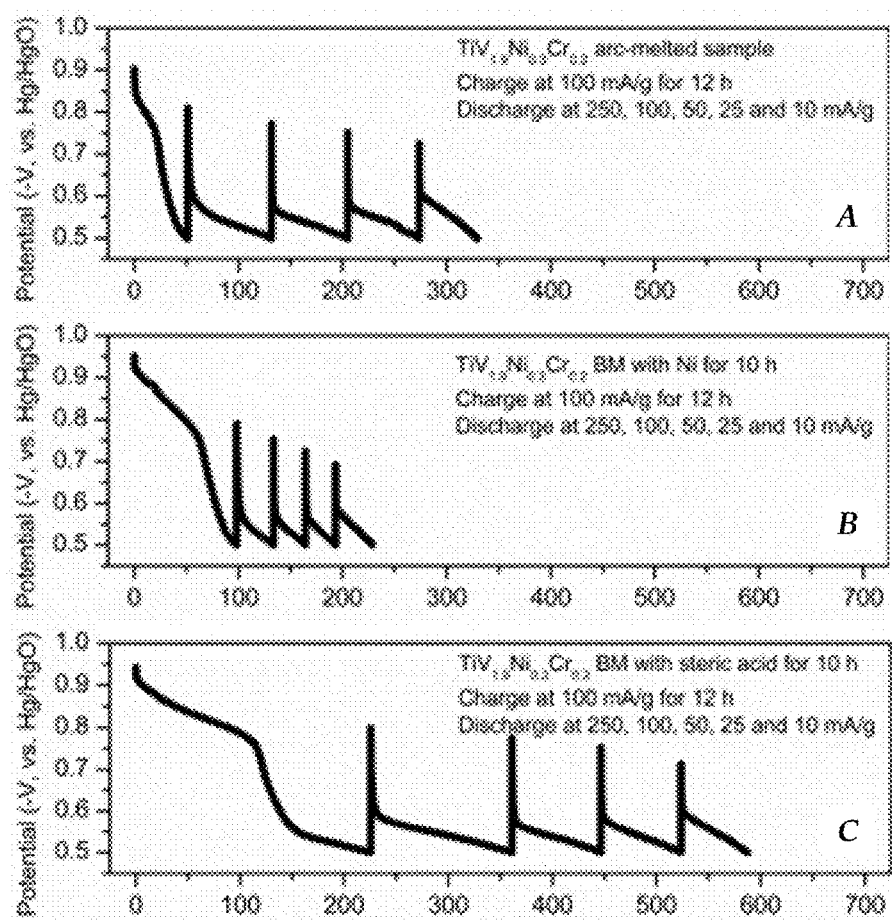
FIG. 15: A-C are data plots of potential as a function of specific capacity during a five step discharge for as-cast and ball milled Ti—V—Cr—Ni alloys.
Figure 16:
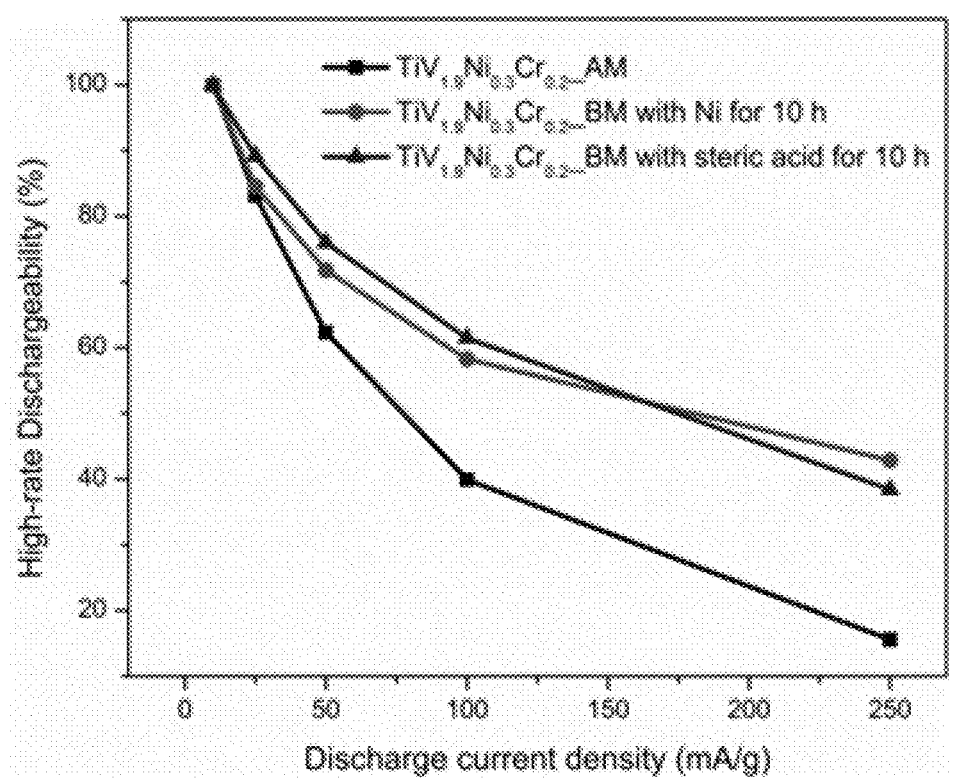
FIG. 16 is a data plot of high rate dischargeability (HRD) as a function of discharge current density for as-cast and ball milled Ti—V—Cr—Ni alloys processed by conventional cooling.

X-ray diffraction (XRD) and SEM were employed to characterize the alloy after completion of ball milling and the results are illustrated in FIGS. 13 and 14A-14C, respectively. The sample with nickel powder as the dispersion agent shows the smallest average particle size, with plate-like morphology. XRD patterns shows ball-milling with nickel results in broadened and shorter diffraction peaks, likely indicating significant strain and surface oxidation. Ball-milling with stearic acid generated a wide range of particle size distribution, from nano-sized particles up to tens of micrometers. However, diffraction patterns were not significantly modified after milling with stearic acid. Both ball-milling samples show considerate improvement in reaction kinetics (FIGS. 15 and 16). Ball-milling with nickel reduces discharge capacity, which is most likely brought by strain and surface oxidation.

Kinetic Studies—As-Cooled and Ball-Milled Ti—V—Cr—Ni Alloys:

Samples of as-cooled and ball milled $TiV_{1.7}Cr_{0.4}Ni_{0.3}$ were further subjected to kinetic testing to compare their performance. As discussed in greater detail below, these measurements demonstrate that smaller particle size leads to improved kinetics.

(a) Discharge Capacity:

Electrochemical cycling experiments were conducted in a half cell containing the MH electrode, KOH electrolyte, and $Ni(OH)_2$ counter electrode. The MH electrode was charged at 100 mA/g for 12 h and discharged five times at 250 mA/g, 100 mA/g, 50 mA/g, 25 mA/g, and 10 mA/g; each to a cut-off voltage of −0.5V vs. Hg/HgO reference electrode. The multistep discharge curves at the above-referenced current densities are illustrated in FIG. 15A-15C. It can be seen that the conventionally cooled sample (FIG. 15A) with no further physical treatment shows a discharge capacity of around 350 mAh/g. In contrast, while samples that were ball milled (FIG. 15B) and ball milled in combination with stearic acid (FIG. 15C) show capacity around 250 mAh/g and 600 mAh/g, respectively.

FIG. 16 shows that the HRD for both ball-milled samples are considerably higher than conventionally cooled sample. This is likely the reason why the discharge capacity of the sample milled with stearic acid is significantly higher, since at the same cut-off voltage more hydrogen can be discharged. The sample milled with nickel alone shows much smaller capacity, probably related to too much strain and surface oxidation of the particles.

The notable feature observed here in these results is that ball-milling procedures can be conveniently adjusted to change the particle morphology. And the main function of ball-milling is two-fold: (1) reducing particle size; and (2) suppressing chemical unmixing so that separation of the primary and secondary regions is smaller. Both these two factors lead to improved rate capability.

(b) High Rate Dischargeability (HRD):

In order to further investigate the reaction kinetics of the MH alloys, measurements of high-rate dischargeability (HRD) were performed on the as-cooled and ball milled $TiV_{1.9}Cr_{0.2}Ni_{0.3}$ alloys prepared by conventional cooling. As illustrated in FIG. 16, the ball milled alloys exhibit significant improvement in HRD at high rate, as compared to the as-cooled alloy.

The terms comprise, include, and/or plural forms of each are open ended and include the listed parts and can include additional parts that are not listed. The term and/or is open ended and includes one or more of the listed parts and combinations of the listed parts.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

STATEMENTS REGARDING INCORPORATION BY REFERENCE AND VARIATIONS

All references throughout this application, for example patent documents including issued or granted patents or equivalents; patent application publications; and non-patent literature documents or other source material; are hereby incorporated by reference herein in their entireties, as though individually incorporated by reference, to the extent each reference is at least partially not inconsistent with the disclosure in this application (for example, a reference that is partially inconsistent is incorporated by reference except for the partially inconsistent portion of the reference).

The terms and expressions which have been employed herein are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments, exemplary embodiments and optional features, modification and variation of the concepts herein disclosed may be resorted to by those skilled in the art, and that such modifications and variations are considered to be within the scope of this invention as defined by the appended claims. The specific embodiments provided herein are examples of useful embodiments of the present invention and it will be apparent to one skilled in the art that the present invention may be carried out using a large number of variations of the devices, device components, methods steps set forth in the present description. As will be obvious to one of skill in the art, methods and devices useful for the present methods can include a large number of optional composition and processing elements and steps.

Every formulation or combination of components described or exemplified herein can be used to practice the invention, unless otherwise stated.

All patents and publications mentioned in the specification are indicative of the levels of skill of those skilled in the art to which the invention pertains. References cited herein are incorporated by reference herein in their entirety to indicate the state of the art as of their publication or filing date and it is intended that this information can be employed herein, if needed, to exclude specific embodiments that are in the prior art. For example, when composition of matter are claimed, it should be understood that compounds known and available in the art prior to Applicant's invention, including compounds for which an enabling disclosure is provided in the references cited herein, are not intended to be included in the composition of matter claims herein.

It must be noted that as used herein and in the appended claims, the singular forms "a", "an", and "the" include plural reference unless the context clearly dictates otherwise. Thus, for example, reference to "a cell" includes a plurality of such cells and equivalents thereof known to those skilled in the art, and so forth. As well, the terms "a" (or "an"), "one or more" and "at least one" can be used interchangeably herein. It is also to be noted that the terms "comprising", "including", and "having" can be used interchangeably. The expression "of any of claims XX-YY" (wherein XX and YY refer to claim numbers) is intended to provide a multiple dependent claim in the alternative form, and in some embodiments is interchangeable with the expression "as in any one of claims XX-YY."

Unless defined otherwise, all technical and scientific terms used herein have the same meanings as commonly understood by one of ordinary skill in the art to which this invention belongs. Although any methods and materials similar or equivalent to those described herein can be used in the practice or testing of the present invention, the preferred methods and materials are now described. Nothing herein is to be construed as an admission that the invention is not entitled to antedate such disclosure by virtue of prior invention.

Every formulation or combination of components described or exemplified herein can be used to practice the invention, unless otherwise stated.

Whenever a range is given in the specification, for example, a temperature range, a time range, or a composition or concentration range, all intermediate ranges and subranges, as well as all individual values included in the ranges given are intended to be included in the disclosure. As used herein, ranges specifically include the values provided as endpoint values of the range. For example, a range of 1 to 100 specifically includes the end point values of 1 and 100. It will be understood that any subranges or individual values in a range or subrange that are included in the description herein can be excluded from the claims herein.

As used herein, "comprising" is synonymous with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. In each instance herein any of the terms "comprising", "consisting essentially of" and "consisting of" may be replaced with either of the other two terms. The invention illustratively described herein suitably may be practiced in the absence of any element or elements, limitation or limitations which is not specifically disclosed herein.

One of ordinary skill in the art will appreciate that starting materials, biological materials, reagents, synthetic methods, purification methods, analytical methods, assay methods, and biological methods other than those specifically exemplified can be employed in the practice of the invention without resort to undue experimentation. All art-known functional equivalents, of any such materials and methods are intended to be included in this invention. The terms and expressions which have been employed are used as terms of description and not of limitation, and there is no intention that in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

We claim:

1. A method of fabricating a metal alloy, said method comprising at least one of the steps of:
    rapidly cooling an alloy precursor; and
    ball milling the alloy precursor;
    wherein the alloy precursor comprises titanium (Ti), vanadium (V), nickel (Ni), and at least one of chromium (Cr) and iron (Fe);
    thereby generating said metal alloy characterized by a heterogeneous microstructure having a body centered cubic (BCC) crystal structure, said heterogeneous microstructure comprising:
    a plurality of primary regions characterized by a lattice parameter selected from the range of 3.02 Å to 3.22 Å; and
    a plurality of secondary regions characterized by a lattice parameter selected from the range of 3.00 Å to 3.22 Å and having at least one physical dimension with a maximum average value less than 1 µm;
    wherein said at least one of rapidly cooling and ball milling said alloy precursor provides for said heterogeneous microstructure being characterized by a maximum average distance between a center of a primary region and a nearest secondary region of less than 1.5 µm.

2. The method of claim 1, wherein the alloy is capable of sorbing at least 1.3 wt. % hydrogen at a pressure less than 2 atm.

3. The method of claim 1, wherein the maximum average value of the at least one physical dimension is less than 0.5 µm.

4. The method of claim 1, wherein the secondary region is mixed within a matrix of the primary region.

5. The method of claim 1, wherein:
    the plurality of primary regions are further characterized by an amount of vanadium greater than 54 at. % and an amount of nickel less than 9 at. %; and
    the plurality of secondary regions are further characterized by an amount of vanadium less than 40 at. % and an amount of nickel greater than 15 at %.

6. The method of claim 1, wherein:
    the plurality of primary regions are further characterized by an amount of titanium less than 31 at. %; and
    the plurality of secondary regions are further characterized by an amount of titanium greater than 30 at. %.

7. The method of claim 1, wherein the heterogeneous microstructure further comprises a plurality of boundary regions extending between the plurality of primary regions and the plurality of secondary regions, said plurality of boundary regions characterized by a lattice parameter selected from the range of 3.00 Å to 3.22 Å.

8. The method of claim 1, wherein the composition of the primary region comprises:
    18 at. % to 31 at. % Ti;
    54 at. % to 72 at. % V;
    3 at. % to 9 at. % Ni; and at least one of:
    6 at. % to 13 at. % Cr; and
    2 at. % to 12 at. % Fe.

9. The method of claim 1, wherein the composition of the secondary region comprises:
    30 at. % to 50 at. % Ti;
    8 at. % to 40 at. % V;
    15 at. % to 42 at. % Ni; and at least one of:
    2 at. % to 5 at. % Cr; and
    5 at. % to 18 at. % Fe.

10. The method of claim 1, wherein said providing step comprises:
    mixing titanium (Ti), vanadium (V), nickel (Ni), and at least one of chromium (Cr) and iron (Fe) to form a mixture;
    melting the mixture to generate a first melt; and
    cooling the first melt to generate an ingot of the alloy precursor comprising the mixture of the titanium (Ti), vanadium (V), nickel (Ni), and at least one of chromium (Cr) and iron (Fe).

11. The method of claim 1, said step of rapidly cooling comprising:
cooling a melt of said alloy precursor at a rate selected from the range of greater than $10^4$ K/s to less than $10^8$ K/s.

12. The method of claim 11, wherein said cooling is performed by at least one of suction casting, liquid quenching, air quenching, gas atomization and melt spinning.

13. The method of claim 1, further comprising pulverizing the alloy precursor to a powder having a particle size selected from the range of 0.1 µm to 75 µm.

14. The method of claim 13, wherein said pulverizing comprises at least one of hydrogen activation, mechanical crushing, grinding, and ball milling.

15. The method of claim 1, wherein:
the metal alloy composition is characterized by $Ti_aV_bNi_cCr_dFe_e$;
a is greater than 0 and less than or equal to 97 at. %;
b is greater than 0 and less than 100 at. %;
c is selected from the range of 3 to 20 at. %; and wherein:
d is greater than 0 and less than or equal to 20 at. % and e is selected from the range of 0 to 20 at. %; or d is selected from the range of 0 to 20 at. % and e is greater than 0 and less than or equal to 20 at. %.

16. A method of forming a metal hydride electrode, comprising:
providing an active material comprising the metal alloy fabricated according to claim 1;
mixing a powder of the active material with a binder; and
compressing the mixture of powdered active material and the binder into a desired electrode shape.

17. The method of claim 16, wherein the active material is treated by a hydriding/dehydriding operation for 5 cycles under a pressure from the range between 8 bar to 50 bar prior to mixing with the binder.

18. The method of claim 16, wherein the binder is selected from at least one of nickel, copper, and carbon.

19. The method of claim 16, wherein the powdered active material and the binder are mixed in a ratio selected from the range of 95:5 and 25:75.

20. The method of claim 16, wherein the metal hydride electrode is capable of electrochemical discharge capacity of at least 350 mAh/g at currents of at least 10 mA/g.

21. A metal alloy, comprising:
a composition comprising titanium (Ti), vanadium (V), nickel (Ni), and at least one of chromium (Cr) and iron (Fe);
the alloy further being characterized by a heterogeneous, single phase microstructure having a body centered cubic (BCC) crystal structure, said heterogeneous microstructure comprising:
a plurality of primary regions characterized by a lattice parameter selected from the range of 3.02 Å to 3.22 Å; and
a plurality of secondary regions characterized by a lattice parameter selected from the range of 3.00 Å to 3.22 Å and having at least one physical dimension with a maximum average value less than 1 µm;
wherein said heterogeneous microstructure is characterized by a maximum average distance between a center of a primary region and a nearest secondary region of less than 1.5 µm.

22. The metal alloy of claim 21, wherein the metal alloy is capable of sorbing at least 1.3 wt. % hydrogen at a pressure less than 2 atm.

23. The metal alloy of claim 21, wherein the maximum average value of the at least one physical dimension is less than 0.5 µm.

24. The metal alloy of claim 21, wherein the secondary region is mixed within a matrix of the primary region.

25. The metal alloy of claim 21, wherein:
the plurality of primary regions are further characterized by an amount of vanadium greater than 54 at. % and an amount of nickel less than 9 at. %; and
the plurality of secondary regions are further characterized by an amount of vanadium less than 40 at. % and an amount of nickel greater than 15 at. %.

26. The metal alloy of claim 21, wherein:
the plurality of primary regions are further characterized by an amount of titanium less than 31 at. %; and
the plurality of secondary regions are further characterized by an amount of titanium greater than 30 at. %.

27. The metal alloy of claim 21, wherein the heterogeneous microstructure further comprises a plurality of boundary regions extending between the plurality of primary regions and the plurality of secondary regions, said plurality of boundary regions characterized by a lattice parameter selected from the range of 3.00 Å to 3.22 Å.

28. The metal alloy of claim 21, wherein the composition of the primary region comprises:
18 at. % to 31 at. % Ti;
54 at. % to 72 at. % V;
3 at. % to 9 at. % Ni; and at least one of:
6 at. % to 13 at. % Cr; and
2 at. % to 12 at. % Fe.

29. The metal alloy of claim 21, wherein the composition of the secondary region comprises:
30 at. % to 50 at. % Ti;
8 at. % to 40 at. % V;
15 at. % to 42 at. % Ni; and at least one of:
2 at. % to 5 at. % Cr; and
5 at. % to 18 at. % Fe.

30. The metal alloy of claim 21, wherein:
the metal alloy composition is characterized by $Ti_aV_bNi_cCr_dFe_e$;
a is greater than 0 and less than or equal to 97 at. %;
b is greater than 0 and less than 100 at. %;
c is selected from the range of 3 to 20 at. %; and wherein:
d is greater than 0 and less than or equal to 20 at. % and e is selected from the range of 0 to 20 at. %; or d is selected from the range of 0 to 20 at. % and e is greater than 0 and less than or equal to 20 at. %.

31. The metal alloy of claim 21, wherein metal alloy is characterized bar $Ti_{29}V_{56}Cr_6Ni_9$, $Ti_{29}V_{53}Cr_9Ni_9$, or $Ti_{29}V_{50}Cr_{12}Ni_9$.

32. The metal alloy of claim 30, wherein the composition is characterized by $Ti_aV_{2.1-b}Ni_cFe_d$ and wherein the ratio of Fe/(V+Fe) is selected from the range of 0 to 0.4.

33. A metal hydride electrode comprising:
an active material comprising the metal alloy of claim 21; and
a binder.

34. The metal hydride electrode of claim 33, wherein the metal hydride electrode is capable of electrochemical discharge capacity of at least 350 mAh/g at currents of at least 10 mA/g.

35. The metal hydride electrode of claim 33, wherein the metal hydride electrode is capable of discharging at least 65% of a total capacity of the electrode at 167 mA/g for at least 100 cycles.

36. The metal hydride electrode of claim 33, wherein an exchange current density of the metal hydride electrode is greater by a factor of at least 10% compared to that of a metal hydride electrode having the same composition and not characterized by said heterogeneous microstructure.

37. The metal hydride electrode of claim 33, wherein a limiting current density of the metal hydride electrode is greater by a factor of at least 10% compared to that of a metal hydride electrode having the same composition and not characterized by said heterogeneous microstructure.

38. A metal alloy, comprising:
a composition comprising titanium (Ti), vanadium (V), nickel (Ni), and at least one of chromium (Cr) and iron (Fe); and
a heterogeneous, single phase microstructure having a body centered cubic (BCC) crystal structure, said heterogeneous microstructure comprising a mixture of a plurality of secondary regions in a matrix of a plurality of primary regions, wherein:
said plurality of primary regions characterized by a lattice parameter selected from the range of 3.02 Å to 3.22 Å;
said plurality of secondary regions characterized by a lattice parameter selected from the range of 3.00 Å to 3.22 Å and having at least one physical dimension with a maximum average value less than 1 μm; and
said heterogeneous microstructure is characterized by a maximum average distance between a center of a primary region and a nearest secondary region of less than 1.5 μm;
wherein said heterogeneous microstructure is formed via at least one of rapid cooling and ball milling of an alloy precursor comprising the titanium (Ti), vanadium (V), nickel (Ni), and at least one of chromium (Cr) and iron (Fe).

39. The metal alloy of claim 38, wherein the alloy is capable of sorbing at least 1.3 wt. % hydrogen at a pressure less than 2 atm.

40. The metal alloy of claim 38, wherein the maximum average value of the at least one physical dimension is less than 0.5 μm.

41. The metal alloy of claim 38, wherein:
the plurality of primary regions are further characterized by an amount of vanadium greater than 54 at. % and an amount of nickel less than 9 at. %; and
the plurality of secondary regions are further characterized by an amount of vanadium less than 40 at. % and an amount of nickel greater than 15 at. %.

42. The metal alloy of claim 38, wherein:
the plurality of primary regions are further characterized by an amount of titanium less than 31 at. %; and
the plurality of secondary regions are further characterized by an amount of titanium greater than 30 at. %.

43. The metal alloy of claim 38, wherein said rapid cooling comprises cooling a melt of said alloy precursor at a rate selected within the range of greater than $10^4$ K/s to less than $10^8$ K/s.

44. A metal hydride electrode, comprising:
an active material comprising the metal alloy of claim 38; and
a binder.

45. The metal hydride electrode of claim 44, wherein the metal hydride electrode is capable of electrochemical discharge capacity of at least 350 mAh/g at currents of at least 10 mA/g.

46. The metal hydride electrode of claim 44, wherein the metal hydride electrode is capable of discharging at least 65% of a total capacity of the electrode at 167 mA/g for at least 100 cycles.

47. The metal hydride electrode of claim 44, wherein an exchange current density of the metal hydride electrode is greater by a factor of at least 10% compared to that of a metal hydride electrode having the same composition and not characterized by said heterogeneous microstructure.

48. The metal hydride electrode of claim 44, wherein a limiting current density of the metal hydride electrode is greater by a factor of at least 10% compared to that of a metal hydride electrode having the same composition and not characterized by said heterogeneous microstructure.

49. The metal hydride electrode of claim 33, wherein a high rate dischargeability (HRD) of said metal hydride electrode is greater by an absolute value that is at least 10% compared to a metal hydride electrode having the same composition and not characterized by said heterogeneous microstructure, for discharge cycles selected from the range of 5 to 10.

50. The metal hydride electrode of claim 33, wherein a high rate dischargeability (HRD) of said metal hydride electrode is greater by an absolute value that is at least 6% compared to a metal hydride electrode having the same composition and not characterized by said heterogeneous microstructure, when a discharge current density is 250 mA/g.

51. The metal hydride electrode of claim 44, wherein a high rate dischargeability (HRD) of said metal hydride electrode is greater by an absolute value that is at least 10% compared to a metal hydride electrode having the same composition and not characterized by said heterogeneous microstructure, for discharge cycles selected from the range of 5 to 10.

52. The metal hydride electrode of claim 44, wherein a high rate dischargeability (HRD) of said metal hydride electrode is greater by an absolute value that is at least 6% compared to a metal hydride electrode having the same composition and not characterized by said heterogeneous microstructure, when a discharge current density is 250 mA/g.

53. The method of claim 1, said method comprising ball milling the alloy precursor; wherein at least said ball milling said alloy precursor provides for said heterogeneous microstructure being characterized by a maximum average distance between a center of a primary region and a nearest secondary region of less than 1.5 μm.

54. The method of claim 1, said method comprising a combination of steps of rapidly cooling the alloy precursor and ball milling the alloy precursor; wherein said combination of rapidly cooling and ball milling said alloy precursor provides for said heterogeneous microstructure being characterized by a maximum average distance between a center of a primary region and a nearest secondary region of less than 1.5 μm.

55. The metal alloy of claim 38, wherein said heterogeneous microstructure is formed via at least ball milling of said alloy precursor.

56. The metal alloy of claim 38, wherein said heterogeneous microstructure is formed via a combination of rapid cooling and ball milling of said alloy precursor.

57. The method of claim 1, wherein said alloy precursor is a mixture comprising said titanium (Ti), vanadium (V), nickel (Ni), and at least one of chromium (Cr) and iron (Fe).

58. The metal alloy of claim 38, wherein said alloy precursor is a mixture comprising said titanium (Ti), vanadium (V), nickel (Ni), and at least one of chromium (Cr) and iron (Fe).

* * * * *